(12) United States Patent
Harris et al.

(10) Patent No.: US 12,539,118 B2
(45) Date of Patent: Feb. 3, 2026

(54) SURGICAL INSTRUMENTS WITH SEPARABLE MOTORS AND MOTOR CONTROL CIRCUITS

(71) Applicant: Cilag GmbH International, Zug (CH)

(72) Inventors: Jason L. Harris, Lebanon, OH (US);
David C. Yates, Morrow, OH (US);
Frederick E. Shelton, IV, Hillsboro, OH (US)

(73) Assignee: Cilag GmbH International, Zug (CH)

( * ) Notice: Subject to any disclaimer, the term of this patent is extended or adjusted under 35 U.S.C. 154(b) by 0 days.

(21) Appl. No.: 18/946,407

(22) Filed: Nov. 13, 2024

(65) Prior Publication Data

US 2025/0176960 A1 Jun. 5, 2025

Related U.S. Application Data

(63) Continuation of application No. 18/214,242, filed on Jun. 26, 2023, now Pat. No. 12,156,653, which is a continuation of application No. 17/209,794, filed on Mar. 23, 2021, now abandoned, which is a continuation of application No. 16/378,006, filed on Apr. 8, 2019, now Pat. No. 11,129,613, which is a
(Continued)

(51) Int. Cl.
*A61B 17/072* (2006.01)
*A61B 17/00* (2006.01)
*A61B 17/29* (2006.01)
*A61B 90/00* (2016.01)

(52) U.S. Cl.
CPC ...... *A61B 17/072* (2013.01); *A61B 17/07207* (2013.01); *A61B 2017/00017* (2013.01); *A61B 2017/00039* (2013.01); *A61B 2017/00075* (2013.01); *A61B 2017/00084* (2013.01); *A61B 2017/00123* (2013.01); *A61B 2017/00137* (2013.01); *A61B 2017/00199* (2013.01); *A61B 2017/00314* (2013.01); *A61B 2017/00398* (2013.01); *A61B 2017/0046* (2013.01); *A61B 2017/00473* (2013.01); *A61B 2017/00734* (2013.01); *A61B 2017/07257* (2013.01); *A61B 2017/07271* (2013.01); *A61B 2017/2903* (2013.01); *A61B 2090/0808* (2016.02); *A61B 2090/0809* (2016.02)

(58) Field of Classification Search
CPC .................................................. A61B 17/072
See application file for complete search history.

(56) References Cited

U.S. PATENT DOCUMENTS

| | | | |
|---|---|---|---|
| 8,573,459 B2 | 11/2013 | Smith et al. | |
| 8,795,159 B2 | 8/2014 | Moriyama | |
| 8,851,355 B2 | 10/2014 | Aranyi et al. | |

(Continued)

FOREIGN PATENT DOCUMENTS

| | | |
|---|---|---|
| CN | 104586463 A | 5/2015 |
| JP | H02106189 A | 4/1990 |

*Primary Examiner* — Nathaniel C Chukwurah
(74) *Attorney, Agent, or Firm* — Lempia Summerfield Katz LLC

(57) ABSTRACT

A surgical instrument comprising a motor, a user interface, and a control circuit is disclosed. The motor is configured to drive an actuation of an end effector. The control circuit is configured to prevent an activation of the motor, display instructions for replacing the motor via the user interface, detect installation of a replacement motor, and allow an activation of the replacement motor.

20 Claims, 26 Drawing Sheets

Related U.S. Application Data continuation of application No. 14/984,552, filed on Dec. 30, 2015, now Pat. No. 10,265,068.

(56) References Cited

U.S. PATENT DOCUMENTS

| | | |
|---|---|---|
| 9,113,880 B2 | 8/2015 | Zemlok et al. |
| 9,265,585 B2 | 2/2016 | Wingardner et al. |
| 9,439,651 B2 | 9/2016 | Smith et al. |
| 9,700,309 B2 | 7/2017 | Jaworek et al. |
| 9,826,976 B2 | 11/2017 | Parihar et al. |
| 9,913,642 B2 | 3/2018 | Leimbach et al. |
| 9,987,099 B2 | 6/2018 | Chen et al. |
| 10,117,654 B2 | 11/2018 | Ingmanson et al. |
| 10,133,248 B2 | 11/2018 | Fitzsimmons et al. |
| 10,136,887 B2 | 11/2018 | Shelton, IV et al. |
| 10,175,127 B2 | 1/2019 | Collins et al. |
| 10,285,694 B2 | 5/2019 | Viola et al. |
| 10,405,857 B2 | 9/2019 | Shelton, IV et al. |
| 10,492,814 B2 | 12/2019 | Snow et al. |
| 2009/0090763 A1 | 4/2009 | Zemlok et al. |
| 2014/0110453 A1 | 4/2014 | Wingardner et al. |
| 2014/0246471 A1* | 9/2014 | Jaworek ................ A61B 34/30 227/175.1 |
| 2014/0309666 A1* | 10/2014 | Shelton, IV ......... A61B 17/072 606/139 |
| 2014/0367445 A1 | 12/2014 | Ingmanson et al. |
| 2015/0297200 A1 | 10/2015 | Fitzsimmons et al. |

* cited by examiner

SURGICAL INSTRUMENTS WITH SEPARABLE MOTORS AND MOTOR CONTROL CIRCUITS

CROSS-REFERENCE TO RELATED APPLICATIONS

This application is a continuation patent application claiming priority under 35 U.S.C. § 120 to U.S. patent application Ser. No. 18/214,242, titled SURGICAL INSTRUMENTS WITH MOTOR CONTROL CIRCUITS, filed Jun. 26, 2023, which issued on Dec. 3, 2024 as U.S. Pat. No. 12,156,653, which is a continuation patent application claiming priority under 35 U.S.C. § 120 to U.S. patent application Ser. No. 17/209,794, titled SURGICAL INSTRUMENTS WITH SEPARABLE MOTORS AND MOTOR CONTROL CIRCUITS, filed Mar. 23, 2021, now U.S. Patent Application Publication No. 2021/0275172, which is a continuation patent application claiming priority under 35 U.S.C. § 120 to U.S. patent application Ser. No. 16/378,006, titled SURGICAL INSTRUMENTS WITH SEPARABLE MOTORS AND MOTOR CONTROL CIRCUITS, filed Apr. 8, 2019, which issued on Sep. 28, 2021 as U.S. Pat. No. 11,129,613, which is a continuation patent application claiming priority under 35 U.S.C. § 120 to U.S. patent application Ser. No. 14/984,552, titled SURGICAL INSTRUMENTS WITH SEPARABLE MOTORS AND MOTOR CONTROL CIRCUITS, filed Dec. 30, 2015, which issued on Apr. 23, 2019 as U.S. Pat. No. 10,265,068, the entire disclosures of which are hereby incorporated by reference herein.

This application is related to commonly-owned U.S. patent application Ser. No. 14/984,488, titled MECHANISMS FOR COMPENSATING FOR BATTERY PACK FAILURE IN POWERED SURGICAL INSTRUMENTS, filed Dec. 30, 2015, which issued on May 21, 2019 as U.S. Pat. No. 10,292,704 and U.S. patent application Ser. No. 14/984,525, titled MECHANISMS FOR COMPENSATING FOR DRIVETRAIN FAILURE IN POWERED SURGICAL INSTRUMENTS, filed Dec. 30, 2015, which issued on Aug. 6, 2019 as U.S. Pat. No. 10,368,865, each of which is incorporated herein by reference in its entirety.

BACKGROUND

The present invention relates to surgical instruments and, in various arrangements, to surgical stapling and cutting instruments and staple cartridges for use therewith that are designed to staple and cut tissue.

BRIEF DESCRIPTION OF THE DRAWINGS

The features of the various aspects are set forth with particularity in the appended claims. The various aspects, however, both as to organization and methods of operation, together with advantages thereof, may best be understood by reference to the following description, taken in conjunction with the accompanying drawings as follows:

DESCRIPTION

Before explaining various forms of surgical instruments with separable motors and motor control circuits in detail, it should be noted that the illustrative forms are not limited in application or use to the details of construction and arrangement of parts illustrated in the accompanying drawings and description. The illustrative forms may be implemented or incorporated in other forms, variations and modifications, and may be practiced or carried out in various ways. Further, unless otherwise indicated, the terms and expressions employed herein have been chosen for the purpose of describing the illustrative forms for the convenience of the reader and are not for the purpose of limitation thereof.

Further, it is understood that any one or more of the following-described forms, expressions of forms, examples, can be combined with any one or more of the other following-described forms, expressions of forms, and examples.

Various forms are directed to surgical instruments with separable motors and motor control circuits. In one form, the surgical instruments with separable motors and motor control circuits may be configured for use in open surgical procedures, but has applications in other types of surgery, such as laparoscopic, endoscopic, and robotic-assisted procedures.

FIGS. 1-18 depict various aspects of a surgical system that is generally designated as 10, and is in the form of a powered hand held electromechanical instrument configured for selective attachment thereto of a plurality of different end effectors that are each configured for actuation and manipulation by the powered hand held electromechanical surgical instrument. The aspects of FIGS. 1-18 are disclosed in U.S. Patent Application Publication No. 2014/0110453, filed Oct. 23, 2012, and titled SURGICAL INSTRUMENT WITH RAPID POST EVENT DETECTION, now U.S. Pat. No. 9,265,585, U.S. Patent Application Publication No. 2013/0282052, filed Jun. 19, 2013, and titled APPARATUS FOR ENDOSCOPIC PROCEDURES, now U.S. Pat. No. 9,480,492, and U.S. Patent Application Publication No. 2013/0274722, filed May 10, 2013, and titled APPARATUS FOR ENDOSCOPIC PROCEDURES, now U.S. Pat. No. 9,492,146.

Figure 1:
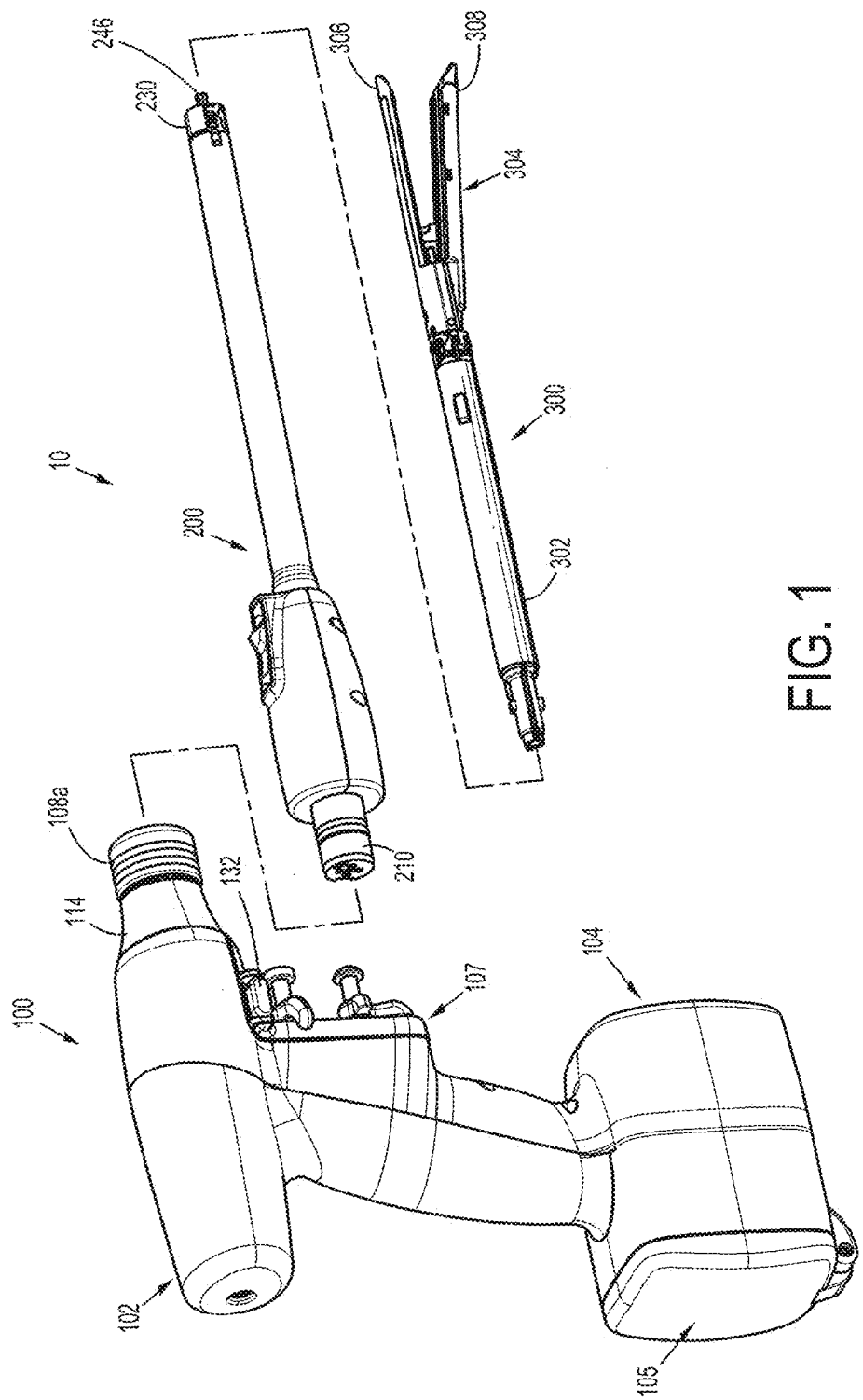
FIG. 1 is a perspective, disassembled view of an electromechanical surgical system including a surgical instrument, an adapter, and an end effector, according to the present disclosure.
Figure 2:
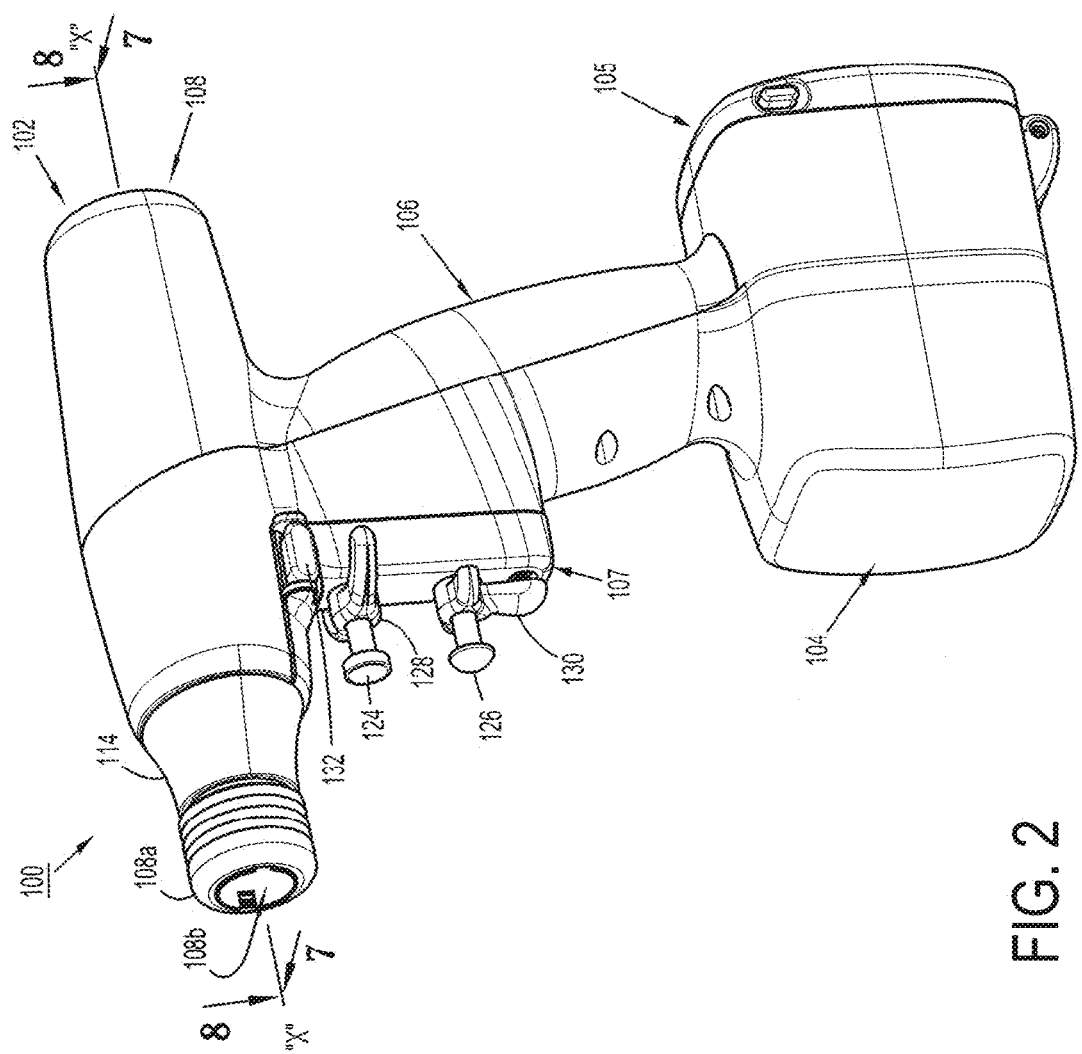
FIG. 2 is a perspective view of the surgical instrument of FIG. 1, according to at least one aspect of the present disclosure.
Figure 3:
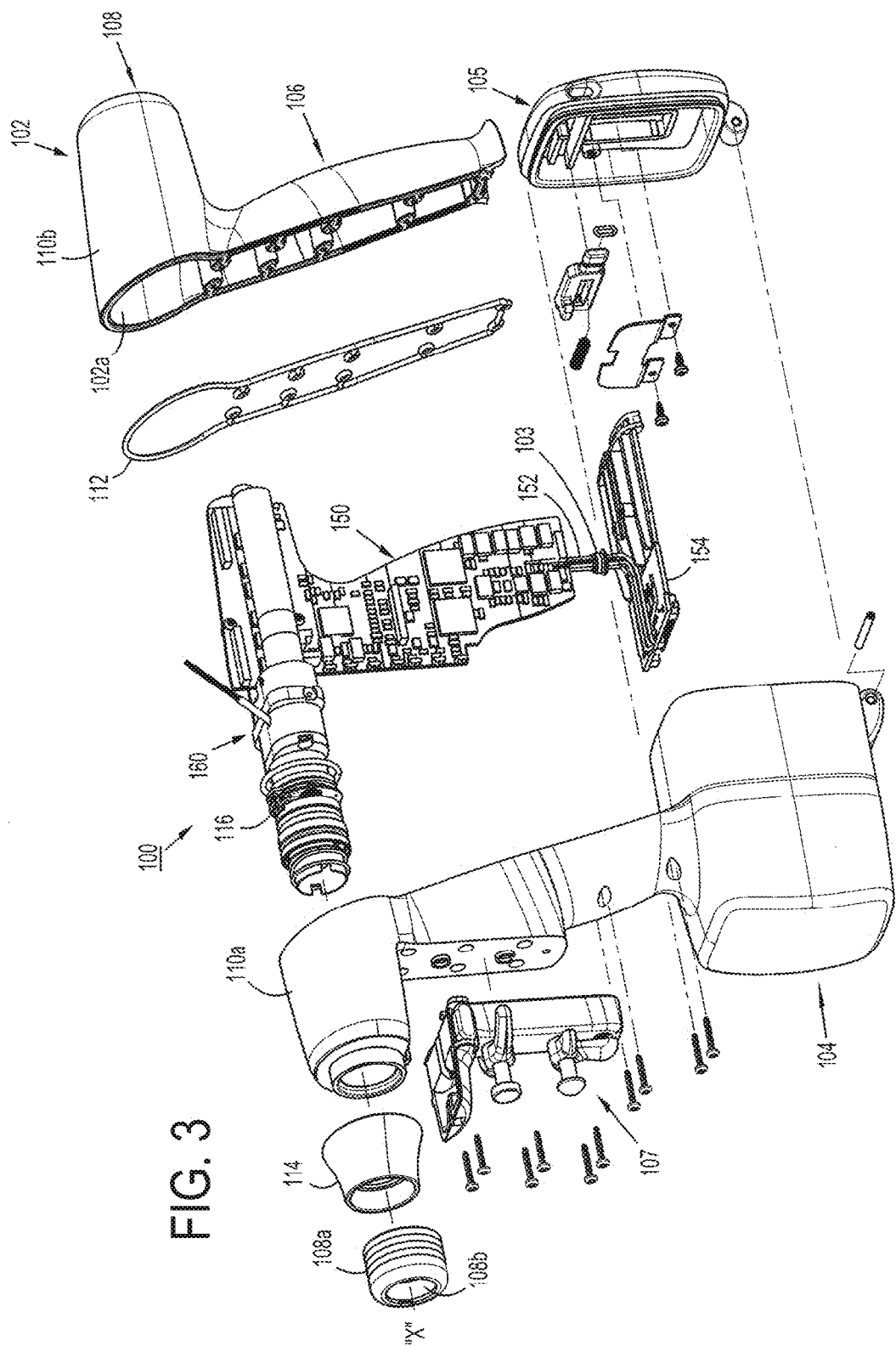
FIG. 3 is perspective, exploded view of the surgical instrument of FIG. 1, according to at least one aspect of the present disclosure.

Referring to FIGS. 1-3, a surgical instrument 100 is configured for selective connection with an adapter 200, and, in turn, adapter 200 is configured for selective connection with an end effector or single use loading unit or reload 300. As illustrated in FIGS. 1-3, the surgical instrument 100 includes a handle housing 102 having a lower housing portion 104, an intermediate housing portion 106 extending from and/or supported on lower housing portion 104, and an upper housing portion 108 extending from and/or supported on intermediate housing portion 106. Intermediate housing portion 106 and upper housing portion 108 are separated into a distal half-section 110a that is integrally formed with and extending from the lower portion 104, and a proximal half-section 110b connectable to distal half-section 110a by a plurality of fasteners. When joined, distal and proximal half-sections 110a, 110b define a handle housing 102 having a cavity 102a therein in which a circuit board 150 and a drive mechanism 160 is situated.

Distal and proximal half-sections 110a, 110b are divided along a plane that traverses a longitudinal axis "X" of upper housing portion 108, as seen in FIGS. 2 and 3. Handle housing 102 includes a gasket 112 extending completely around a rim of distal half-section and/or proximal half-section 110a, 110b and being interposed between distal half-section 110a and proximal half-section 110b. Gasket 112 seals the perimeter of distal half-section 110a and proximal half-section 110b. Gasket 112 functions to establish an air-tight seal between distal half-section 110a and proximal half-section 110b such that circuit board 150 and drive mechanism 160 are protected from sterilization and/or cleaning procedures.

In this manner, the cavity 102a of handle housing 102 is sealed along the perimeter of distal half-section 110a and proximal half-section 110b yet is configured to enable easier, more efficient assembly of circuit board 150 and a drive mechanism 160 in handle housing 102.

Intermediate housing portion 106 of handle housing 102 provides a housing in which circuit board 150 is situated. Circuit board 150 is configured to control the various operations of surgical instrument 100.

Figure 4:
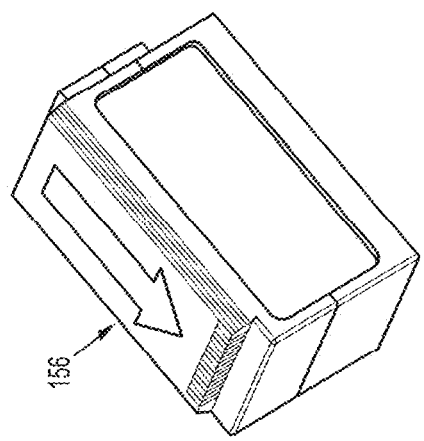
FIG. 4 is a perspective view of a battery of the surgical instrument of FIG. 1, according to at least one aspect of the present disclosure.

Lower housing portion 104 of surgical instrument 100 defines an aperture (not shown) formed in an upper surface thereof and which is located beneath or within intermediate housing portion 106. The aperture of lower housing portion 104 provides a passage through which wires 152 pass to electrically interconnect electrical components (a battery 156, as illustrated in FIG. 4, a circuit board 154, as illustrated in FIG. 3, etc.) situated in lower housing portion 104 with electrical components (circuit board 150, drive mechanism 160, etc.) situated in intermediate housing portion 106 and/or upper housing portion 108.

Handle housing 102 includes a gasket 103 disposed within the aperture of lower housing portion 104 (not shown) thereby plugging or sealing the aperture of lower housing portion 104 while allowing wires 152 to pass therethrough. Gasket 103 functions to establish an air-tight seal between lower housing portion 106 and intermediate housing portion 108 such that circuit board 150 and drive mechanism 160 are protected from sterilization and/or cleaning procedures.

As shown, lower housing portion 104 of handle housing 102 provides a housing in which a rechargeable battery 156, is removably situated. Battery 156 is configured to supply power to any of the electrical components of surgical instrument 100. Lower housing portion 104 defines a cavity (not shown) into which battery 156 is inserted. Lower housing portion 104 includes a door 105 pivotally connected thereto for closing cavity of lower housing portion 104 and retaining battery 156 therein.

Figure 5:
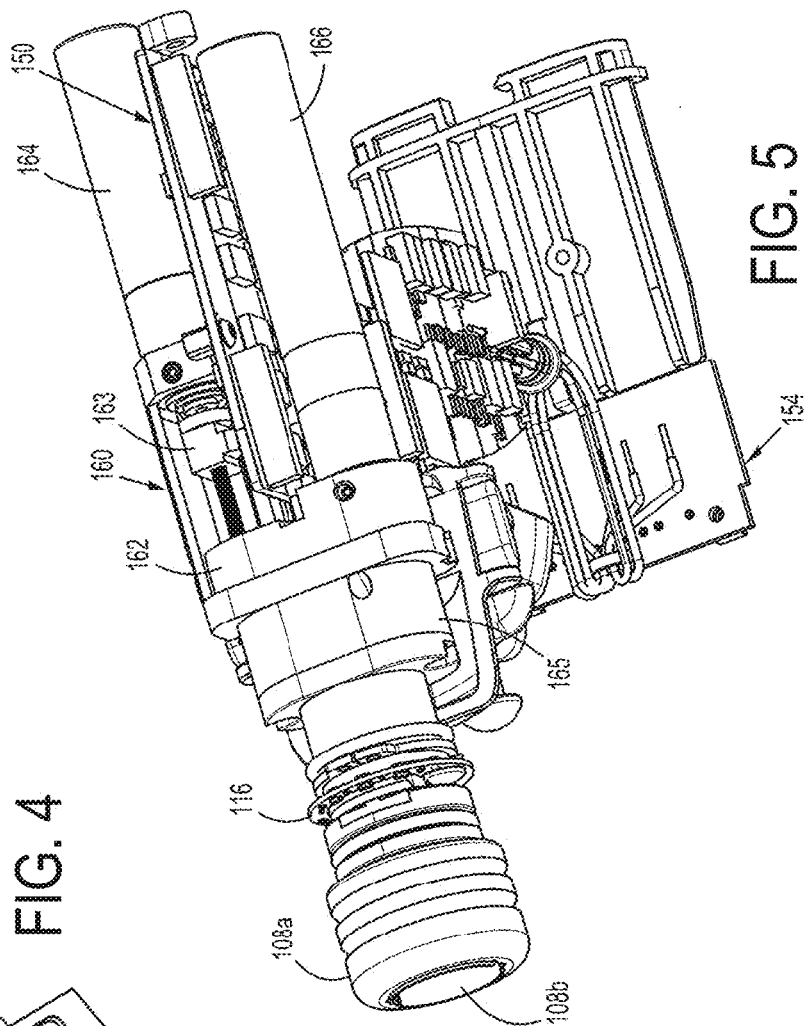
FIG. 5 is a top, partially-disassembled view of the surgical instrument of FIG. 1, according to at least one aspect of the present disclosure.

With reference to FIGS. 3 and 5, distal half-section 110a of upper housing portion 108 defines a nose or connecting portion 108a. A nose cone 114 is supported on nose portion 108a of upper housing portion 108. Nose cone 114 is fabricated from a transparent material. A feedback indicator such as, for example, an illumination member 116 is disposed within nose cone 114 such that illumination member 116 is visible therethrough. Illumination member 116 is may be a light emitting diode printed circuit board (LED PCB). Illumination member 116 is configured to illuminate multiple colors with a specific color pattern being associated with a unique discrete event.

Upper housing portion 108 of handle housing 102 provides a housing in which drive mechanism 160 is situated. As illustrated in FIG. 5, drive mechanism 160 is configured to drive shafts and/or gear components in order to perform the various operations of surgical instrument 100. In particular, drive mechanism 160 is configured to drive shafts and/or gear components in order to selectively move tool assembly 304 of end effector 300 (see FIGS. 1 and 9) relative to proximal body portion 302 of end effector 300, to rotate end effector 300 about a longitudinal axis "X" (see FIG. 2) relative to handle housing 102, to move anvil assembly 306 relative to cartridge assembly 308 of end effector 300, and/or to fire a stapling and cutting cartridge within cartridge assembly 308 of end effector 300.

The drive mechanism 160 includes a selector gearbox assembly 162 that is located immediately proximal relative to adapter 200. Proximal to the selector gearbox assembly 162 is a function selection module 163 having a first motor 164 that functions to selectively move gear elements within the selector gearbox assembly 162 into engagement with an input drive component 165 having a second motor 166.

As illustrated in FIGS. 1-4, and as mentioned above, distal half-section 110a of upper housing portion 108 defines a connecting portion 108a configured to accept a corresponding drive coupling assembly 210 of adapter 200.

Figure 6:
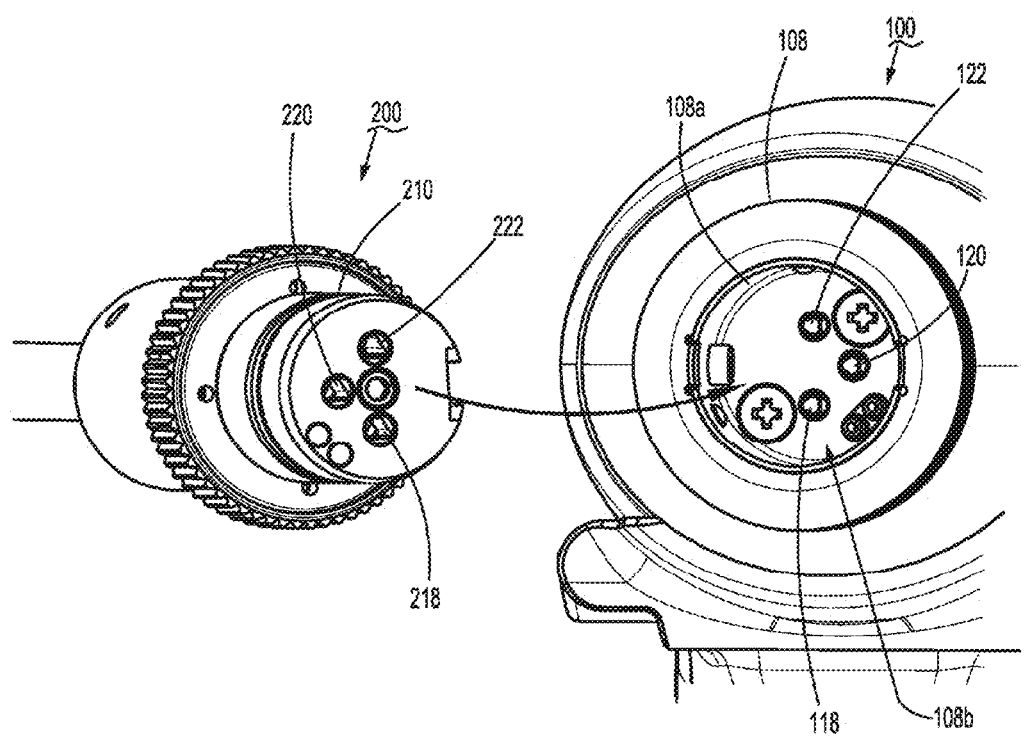
FIG. 6 is a front, perspective view of the surgical instrument of FIG. 1 with the adapter separated therefrom, according to at least one aspect of the present disclosure.
Figure 7:
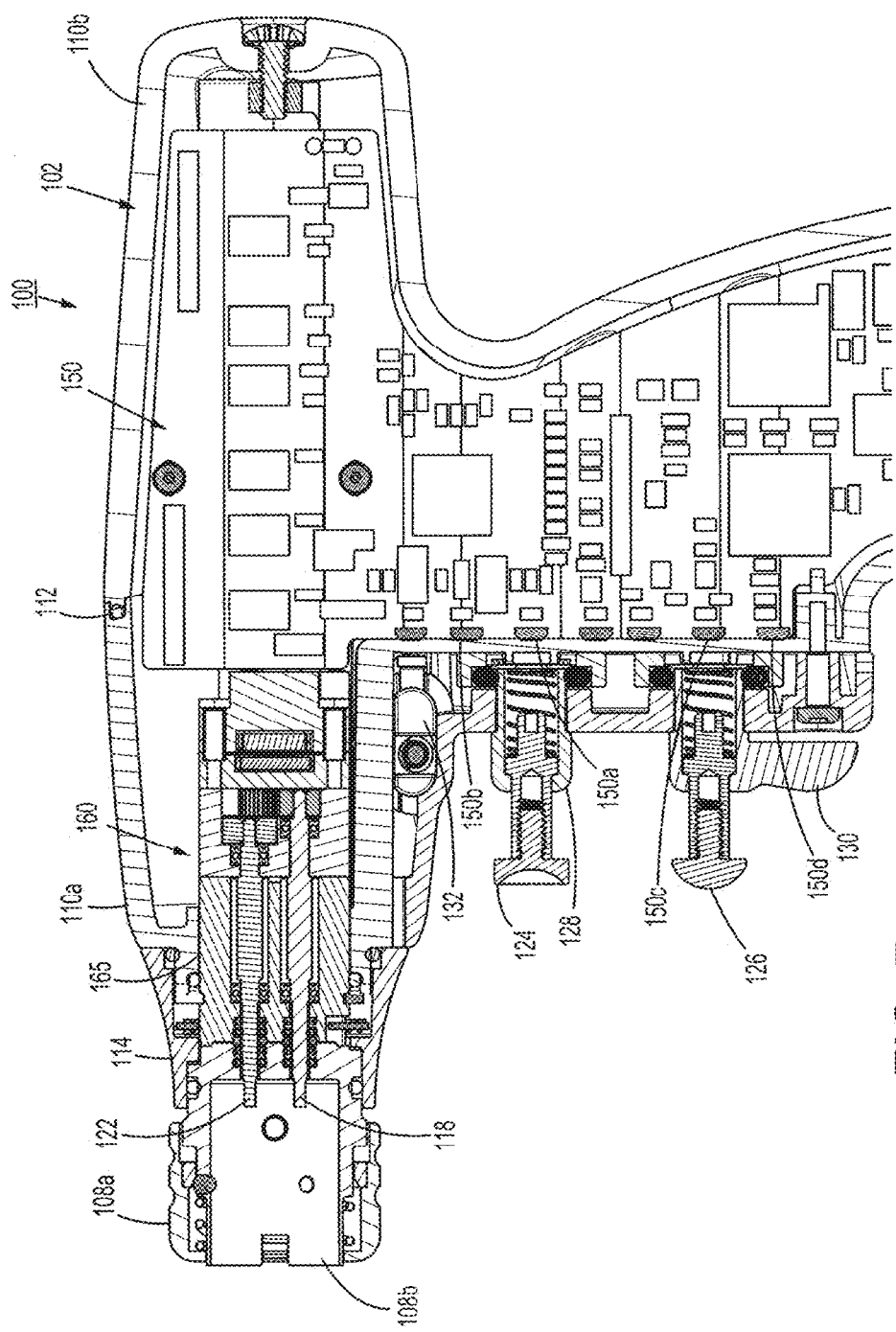
FIG. 7 is a side, cross-sectional view of the surgical instrument of FIG. 1, as taken through 7-7 of FIG. 2, according to at least one aspect of the present disclosure.
Figure 8:
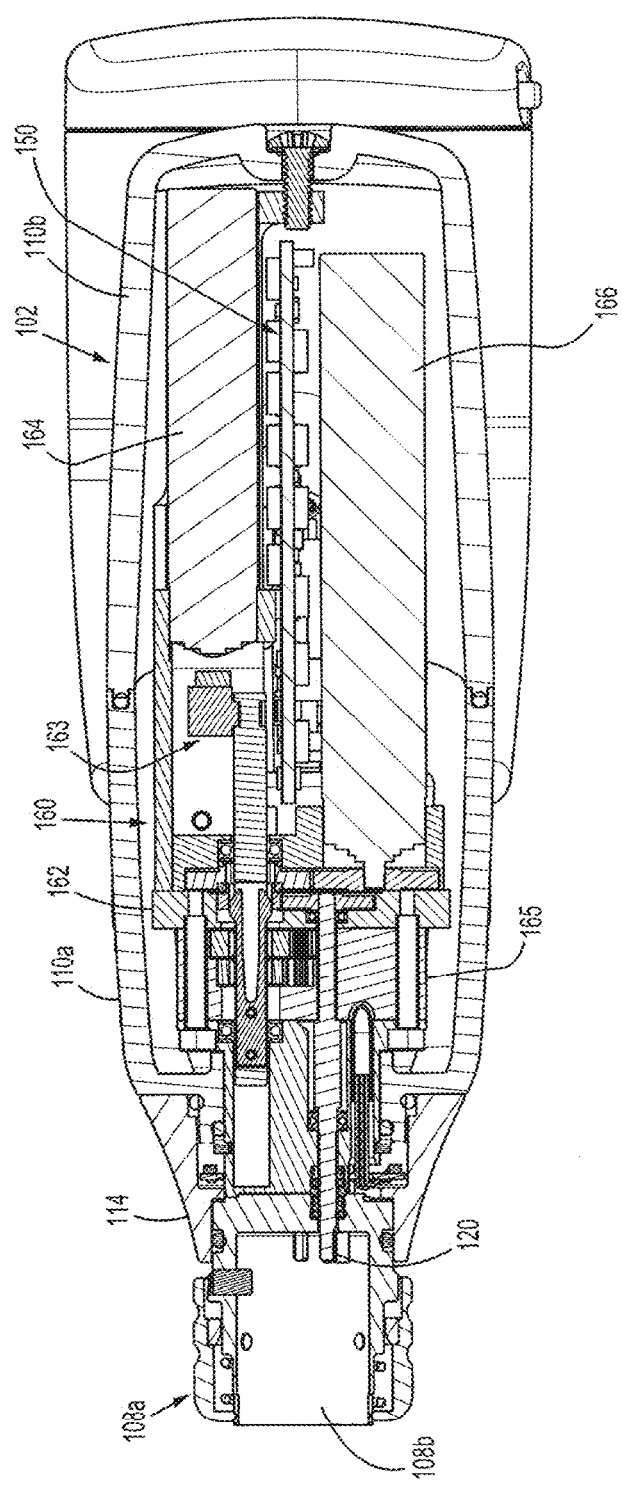
FIG. 8 is a top, cross-sectional view of the surgical instrument of FIG. 1, as taken through 8-8 of FIG. 2, according to at least one aspect of the present disclosure.

As illustrated in FIGS. 6-8, connecting portion 108a of surgical instrument 100 has a cylindrical recess 108b that receives a drive coupling assembly 210 of adapter 200 when adapter 200 is mated to surgical instrument 100. Connecting portion 108a houses three rotatable drive connectors 118, 120, 122.

When adapter 200 is mated to surgical instrument 100, each of rotatable drive connectors 118, 120, 122 of surgical instrument 100 couples with a corresponding rotatable connector sleeve 218, 220, 222 of adapter 200 as shown in FIG. 6. In this regard, the interface between corresponding first drive connector 118 and first connector sleeve 218, the interface between corresponding second drive connector 120 and second connector sleeve 220, and the interface between corresponding third drive connector 122 and third connector sleeve 222 are keyed such that rotation of each of drive connectors 118, 120, 122 of surgical instrument 100 causes a corresponding rotation of the corresponding connector sleeve 218, 220, 222 of adapter 200.

The mating of drive connectors 118, 120, 122 of surgical instrument 100 with connector sleeves 218, 220, 222 of adapter 200 allows rotational forces to be independently transmitted via each of the three respective connector interfaces. The drive connectors 118, 120, 122 of surgical instrument 100 are configured to be independently rotated by drive mechanism 160. In this regard, the function selection module 163 of drive mechanism 160 selects which drive connector or connectors 118, 120, 122 of surgical instrument 100 is to be driven by the input drive component 165 of drive mechanism 160.

Since each of drive connectors 118, 120, 122 of surgical instrument 100 has a keyed and/or substantially non-rotatable interface with respective connector sleeves 218, 220, 222 of adapter 200, when adapter 200 is coupled to surgical instrument 100, rotational force(s) are selectively transferred from drive mechanism 160 of surgical instrument 100 to adapter 200.

The selective rotation of drive connector(s) 118, 120 and/or 122 of surgical instrument 100 allows surgical instrument 100 to selectively actuate different functions of end effector 300. Selective and independent rotation of first drive connector 118 of surgical instrument 100 corresponds to the selective and independent opening and closing of tool assembly 304 of end effector 300, and driving of a stapling/cutting component of tool assembly 304 of end effector 300. Also, the selective and independent rotation of second drive connector 120 of surgical instrument 100 corresponds to the selective and independent articulation of tool assembly 304 of end effector 300 transverse to longitudinal axis "X" (see FIG. 2). Additionally, the selective and independent rotation of third drive connector 122 of surgical instrument 100 corresponds to the selective and independent rotation of end effector 300 about longitudinal axis "X" (see FIG. 2) relative to handle housing 102 of surgical instrument 100.

As mentioned above and as illustrated in FIGS. 5 and 8, drive mechanism 160 includes a selector gearbox assembly 162; and a function selection module 163, located proximal to the selector gearbox assembly 162, that functions to selectively move gear elements within the selector gearbox assembly 162 into engagement with second motor 166. Thus, drive mechanism 160 selectively drives one of drive connectors 118, 120, 122 of surgical instrument 100 at a given time.

As illustrated in FIGS. 1-3, handle housing 102 supports a control assembly 107 on a distal surface or side of intermediate housing portion 108. The control assembly 107 is a fully-functional mechanical subassembly that can be assembled and tested separately from the rest of the instrument 100 prior to coupling thereto.

Control assembly 107, in cooperation with intermediate housing portion 108, supports a pair of finger-actuated control buttons 124, 126 and a pair rocker devices 128, 130 within a housing 107a. The control buttons 124, 126 are coupled to extension shafts 125, 127 respectively. In particular, control assembly 107 defines an upper aperture 124a for slidably receiving the extension shaft 125, and a lower aperture 126a for slidably receiving the extension shaft 127.

The control assembly 107 and its components (e.g., control buttons 124, 126 and rocker devices 128, 130) my be formed from low friction, self-lubricating, lubricious plastics or materials or coatings covering the moving components to reduce actuation forces, key component wear, elimination of galling, smooth consistent actuation, improved component and assembly reliability and reduced clearances for a tighter fit and feel consistency. This includes the use of plastic materials in the bushings, rocker journals, plunger bushings, spring pockets, retaining rings and slider components. Molding the components in plastic also provides net-shape or mesh-shaped components with all of these performance attributes. Plastic components eliminate corrosion and bi-metal anodic reactions under electrolytic conditions such as autoclaving, steam sterilizations and cleaning Press fits with lubricious plastics and materials also eliminate clearances with minimal strain or functional penalties on the components when compared to similar metal components.

Suitable materials for forming the components of the control assembly 107 include, but are not limited to, polyamines, polyphenylene sulfides, polyphthalamides, polyphenylsulfones, polyether ketones, polytetrafluoroethylenes, and combinations thereof. These components may be used in the presence or absence of lubricants and may also include additives for reduced wear and frictional forces.

Reference may be made to a U.S. patent application Ser. No. 13/331,047, now U.S. Pat. No. 8,968,276, the entire contents of which are incorporated by reference herein, for a detailed discussion of the construction and operation of the surgical instrument 100.

Figure 9:
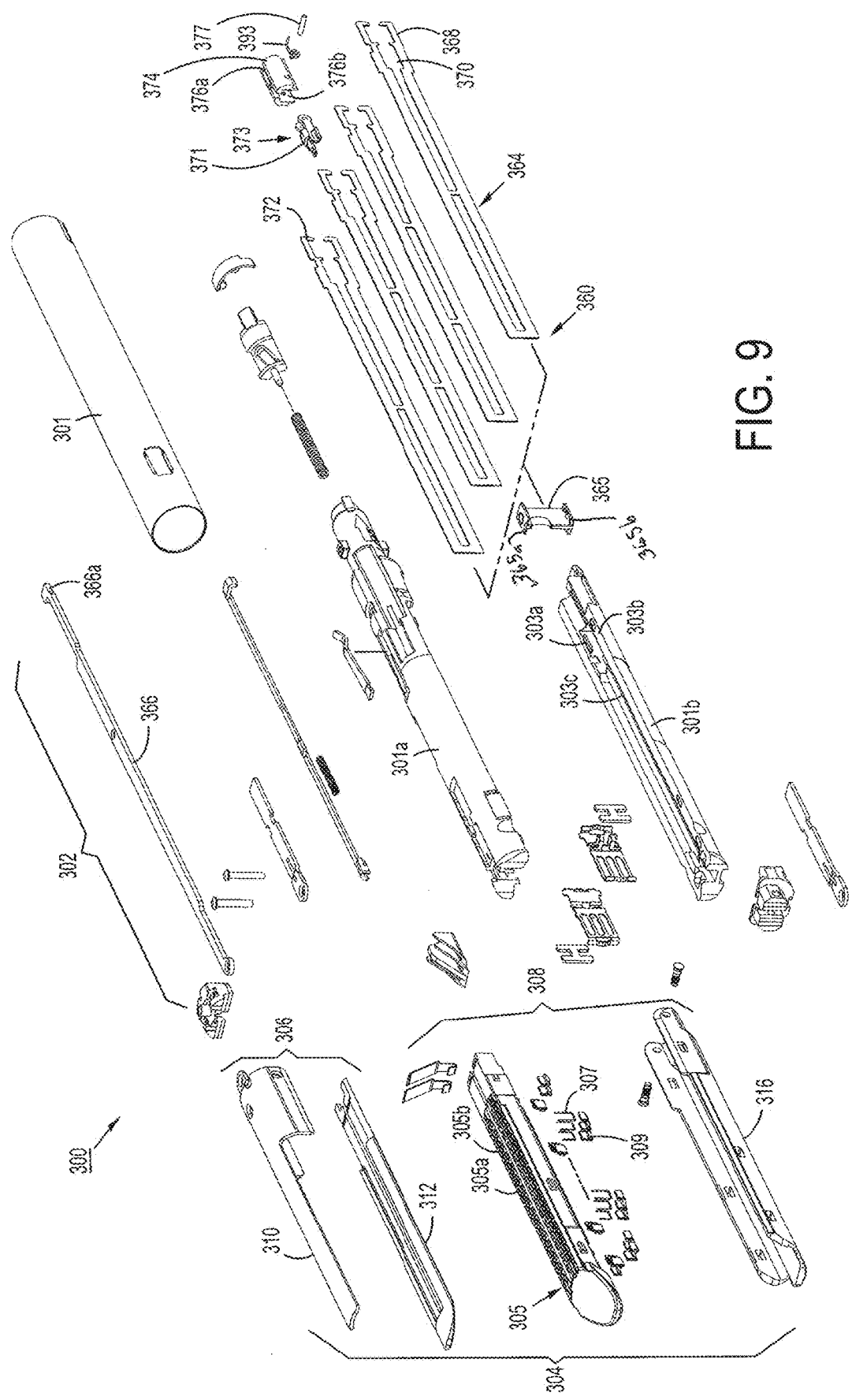
FIG. 9 is a perspective, exploded view of a end effector of FIG. 1, according to at least one aspect of the present disclosure.

The surgical instrument 100 includes a firing assembly configured to deploy or eject a plurality of staples into tissue captured by the end effector 300. The firing assembly comprises a drive assembly 360, as illustrated in FIG. 9. The drive assembly 360 includes a flexible drive beam 364 having a distal end which is secured to a dynamic clamping member 365, and a proximal engagement section 368. Engagement section 368 includes a stepped portion defining a shoulder 370. A proximal end of engagement section 368 includes diametrically opposed inwardly extending fingers 372. Fingers 372 engage a hollow drive member 374 to fixedly secure drive member 374 to the proximal end of beam 364. Drive member 374 defines a proximal porthole 376a which receives a connection member of drive tube 246 (FIG. 1) of adapter 200 when end effector 300 is attached to distal coupling 230 of adapter 200.

When drive assembly 360 is advanced distally within tool assembly 304, an upper beam 365a of clamping member 365 moves within a channel defined between anvil plate 312 and anvil cover 310 and a lower beam 365b moves over the exterior surface of carrier 316 to close tool assembly 304 and fire staples therefrom.

Proximal body portion 302 of end effector 300 includes a sheath or outer tube 301 enclosing an upper housing portion 301a and a lower housing portion 301b. The housing portions 301a and 301b enclose an articulation link 366 having a hooked proximal end 366a which extends from a proximal end of end effector 300. Hooked proximal end 366a of articulation link 366 engages a coupling hook (not shown) of adapter 200 when end effector 300 is secured to distal housing 232 of adapter 200. When drive bar 258 of adapter 200 is advanced or retracted as described above, articulation link 366 of end effector 300 is advanced or retracted within end effector 300 to pivot tool assembly 304 in relation to a distal end of proximal body portion 302.

As illustrated in FIG. 9 above, cartridge assembly 308 of tool assembly 304 includes a staple cartridge 305 supportable in carrier 316. The cartridge can be permanently installed in the end effector 300 or can be arranged so as to be removable and replaceable. Staple cartridge 305 defines a central longitudinal slot 305a, and three linear rows of staple retention slots 305b positioned on each side of longitudinal slot 305a. Each of staple retention slots 305b receives a single staple 307 and a portion of a staple pusher 309. During operation of instrument 100, drive assembly 360 abuts an actuation sled and pushes actuation sled through cartridge 305. As the actuation sled moves through cartridge 305, cam wedges of the actuation sled sequentially engage staple pushers 309 to move staple pushers 309 vertically within staple retention slots 305b and sequentially eject staples 307 therefrom for formation against anvil plate 312.

The hollow drive member 374 includes a lockout mechanism 373 that prevents a firing of previously fired end effectors 300. The lockout mechanism 373 includes a locking member 371 pivotally coupled within a distal porthole 376b via a pin 377, such that locking member 371 is pivotal about pin 377 relative to drive member 374.

Figure 10B:
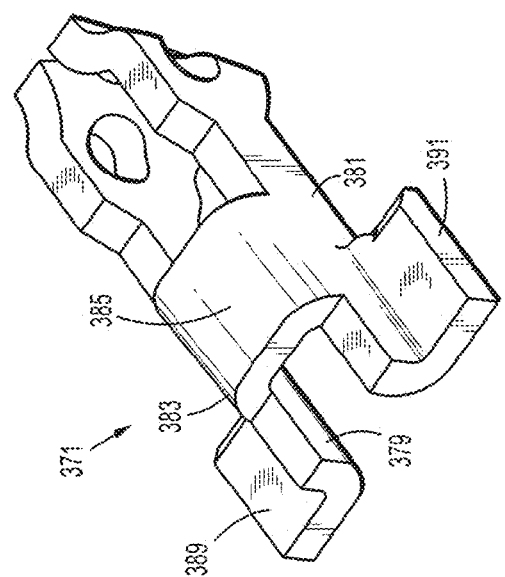
FIG. 10B is a perspective view of the locking member of FIG. 10A according to at least one aspect of the present disclosure.
Figure 10A:
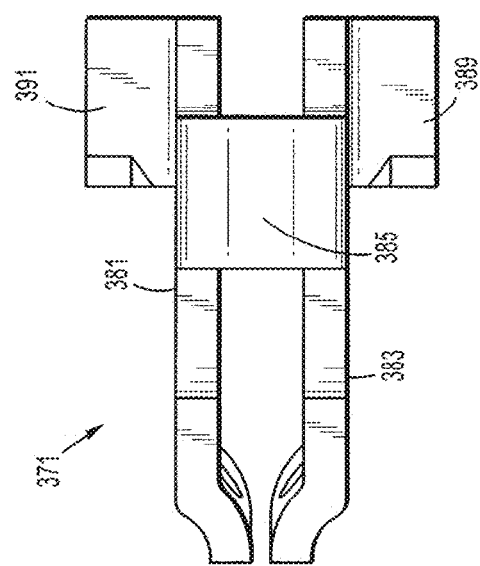
FIG. 10A is a top view of a locking member according to at least one aspect of the present disclosure.

With reference to FIGS. 10A and 10B, locking member 371 defines a channel 379 formed between elongate glides 381 and 383. Web 385 joins a portion of the upper surfaces of glides 381 and 383. Web 385 is configured and dimensioned to fit within the porthole 376b of the drive member 374. Horizontal ledges 389 and 391 extend from glides 381 and 383 respectively. As best shown in FIG. 9, a spring 393 is disposed within the drive member 374 and engages horizontal ledge 389 and/or horizontal ledge 391 to bias locking member 371 downward.

In operation, the locking member 371 is initially disposed in its pre-fired position at the proximal end of the housing portions 301a and 301b with horizontal ledge 389 and 391 resting on top of projections 303a, 303b formed in the sidewalls of housing portion 301b. In this position, locking member 371 is held up and out of alignment with a projection 303c formed in the bottom surface of housing portion 301b, distal of the projection 303a, 303b, and web 385 is in longitudinal juxtaposition with shoulder 370 defined in drive beam 364. This configuration permits the anvil 306 to be opened and repositioned onto the tissue to be stapled until the surgeon is satisfied with the position without activating locking member 371 to disable the disposable end effector 300.

Upon distal movement of the drive beam 364 by the drive tube 246, locking member 371 rides off of projections 303a, 303b and is biased into engagement with housing portion 301b by the spring 393, distal of projection 303c. Locking member 371 remains in this configuration throughout firing of the apparatus.

Upon retraction of the drive beam 364, after at least a partial firing, locking member 371 passes under projections 303a, 303b and rides over projection 303c of housing portion 301b until the distal-most portion of locking member 371 is proximal to projection 303c. The spring 393 biases locking member 371 into juxtaposed alignment with projection 303c, effectively disabling the disposable end effector. If an attempt is made to reactuate the apparatus, loaded with the existing end effector 300, the locking member 371 will abut projection 303c of housing portion 301b and will inhibit distal movement of the drive beam 364.

Figure 11:
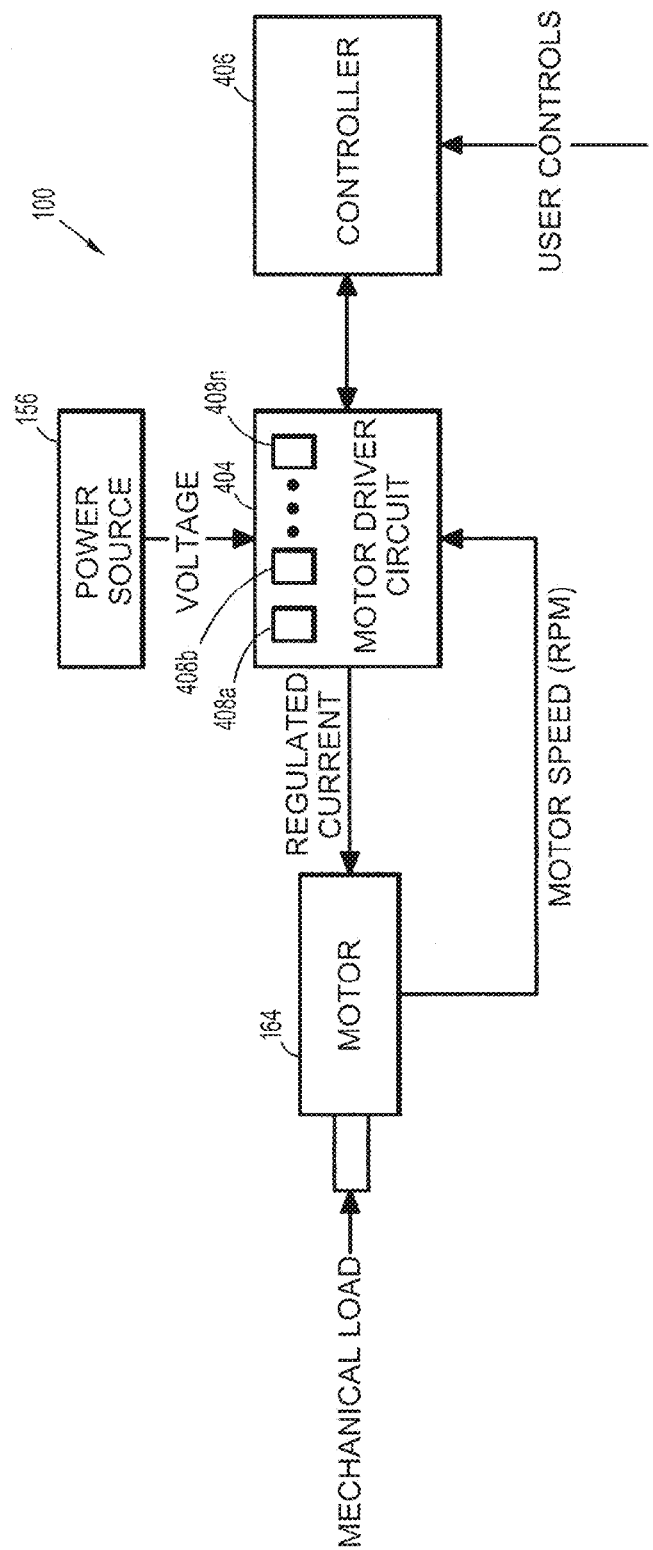
FIG. 11 is a schematic diagram of the surgical instrument of FIG. 1 according to at least one aspect of the present disclosure.

Another aspect of the instrument 100 is shown in FIG. 11. The instrument 100 includes the motor 164. The motor 164 may be any electrical motor configured to actuate one or more drives (e.g., rotatable drive connectors 118, 120, 122 of FIG. 6). The motor 164 is coupled to the battery 156, which may be a DC battery (e.g., rechargeable lead-based, nickel-based, lithium-ion based, battery etc.), an AC/DC transformer, or any other power source suitable for providing electrical energy to the motor 164.

The battery 156 and the motor 164 are coupled to a motor driver circuit 404 disposed on the circuit board 154 which controls the operation of the motor 164 including the flow of electrical energy from the battery 156 to the motor 164. The driver circuit 404 includes a plurality of sensors 408a, 408b, . . . 408n configured to measure operational states of the motor 164 and the battery 156. The sensors 408a-n may include voltage sensors, current sensors, temperature sensors, pressure sensors, telemetry sensors, optical sensors, and combinations thereof. The sensors 408a-408n may measure voltage, current, and other electrical properties of the electrical energy supplied by the battery 156. The sensors 408a-408n may also measure rotational speed as revolutions per minute (RPM), torque, temperature, current draw, and other operational properties of the motor 164. RPM may be determined by measuring the rotation of the motor 164. Position of various drive shafts (e.g., rotatable drive connectors 118, 120, 122 of FIG. 6) may be determined by using various linear sensors disposed in or in proximity to the shafts or extrapolated from the RPM measurements. In aspects, torque may be calculated based on the regulated current draw of the motor 164 at a constant RPM. In further aspects, the driver circuit 404 and/or the controller 406 may measure time and process the above-described values as a function thereof, including integration and/or differentiation, e.g., to determine rate of change of the measured values and the like.

The driver circuit 404 is also coupled to a controller 406, which may be any suitable logic control circuit adapted to perform the calculations and/or operate according to a set of instructions. The controller 406 may include a central processing unit operably connected to a memory which may include transitory type memory (e.g., RAM) and/or non-transitory type memory (e.g., flash media, disk media, etc.). The controller 406 includes a plurality of inputs and outputs for interfacing with the driver circuit 404. In particular, the controller 406 receives measured sensor signals from the driver circuit 404 regarding operational status of the motor 164 and the battery 156 and, in turn, outputs control signals to the driver circuit 404 to control the operation of the motor 164 based on the sensor readings and specific algorithm instructions. The controller 406 is also configured to accept a plurality of user inputs from a user interface (e.g., switches, buttons, touch screen, etc. of the control assembly 107 coupled to the controller 406). A removable memory card or chip may be provided, or data can be downloaded wirelessly.

Referring to FIG. 12-18, a surgical system 10' is depicted. The surgical system 10' is similar in many respects to the surgical system 10. For example, the surgical system 10' includes the surgical instrument 100. Upper housing portion 108 of instrument housing 102 defines a nose or connecting portion 108a configured to accept a corresponding shaft coupling assembly 514 of a transmission housing 512 of a shaft assembly 500 that is similar in many respects to the shaft assembly 200.

The shaft assembly 500 has a force transmitting assembly for interconnecting the at least one drive member of the surgical instrument to at least one rotation receiving member of the end effector. The force transmitting assembly has a first end that is connectable to the at least one rotatable drive member and a second end that is connectable to the at least one rotation receiving member of the end effector. When shaft assembly 500 is mated to surgical instrument 100, each of rotatable drive members or connectors 118, 120, 122 of surgical instrument 100 couples with a corresponding rotatable connector sleeve 518, 520, 522 of shaft assembly 500 (see FIGS. 13 and 15). In this regard, the interface between corresponding first drive member or connector 118 and first connector sleeve 518, the interface between corresponding second drive member or connector 120 and second connector sleeve 520, and the interface between corresponding third drive member or connector 122 and third connector sleeve 522 are keyed such that rotation of each of drive members or connectors 118, 120, 122 of surgical instrument 100 causes a corresponding rotation of the corresponding connector sleeve 518, 520, 522 of shaft assembly 500.

The selective rotation of drive member(s) or connector(s) 118, 120 and/or 122 of surgical instrument 100 allows surgical instrument 100 to selectively actuate different functions of an end effector 400.

Figure 12:
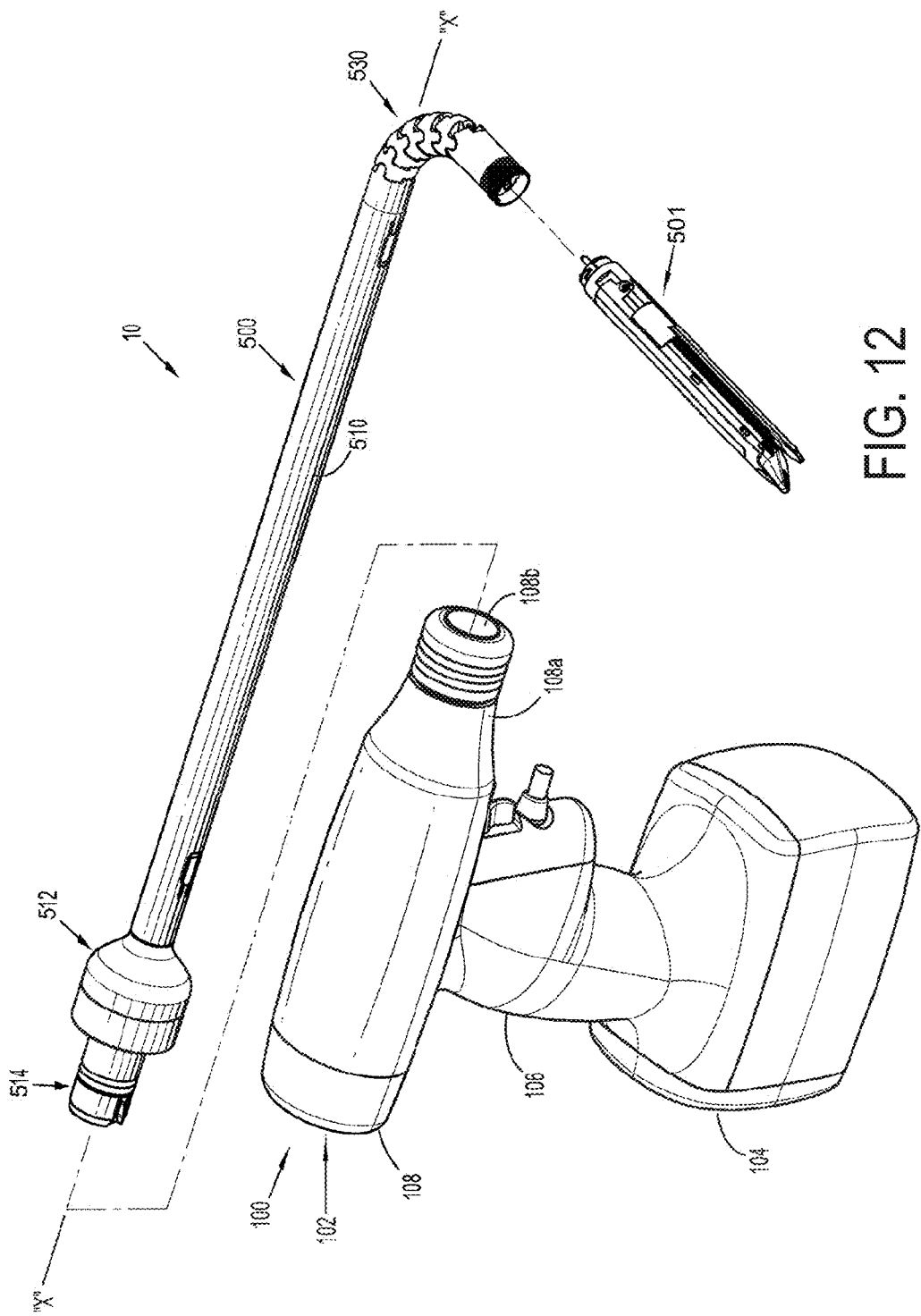
FIG. 12 is a perspective view, with parts separated, of an electromechanical surgical system in accordance with at least one aspect of the present disclosure.
Figure 13:
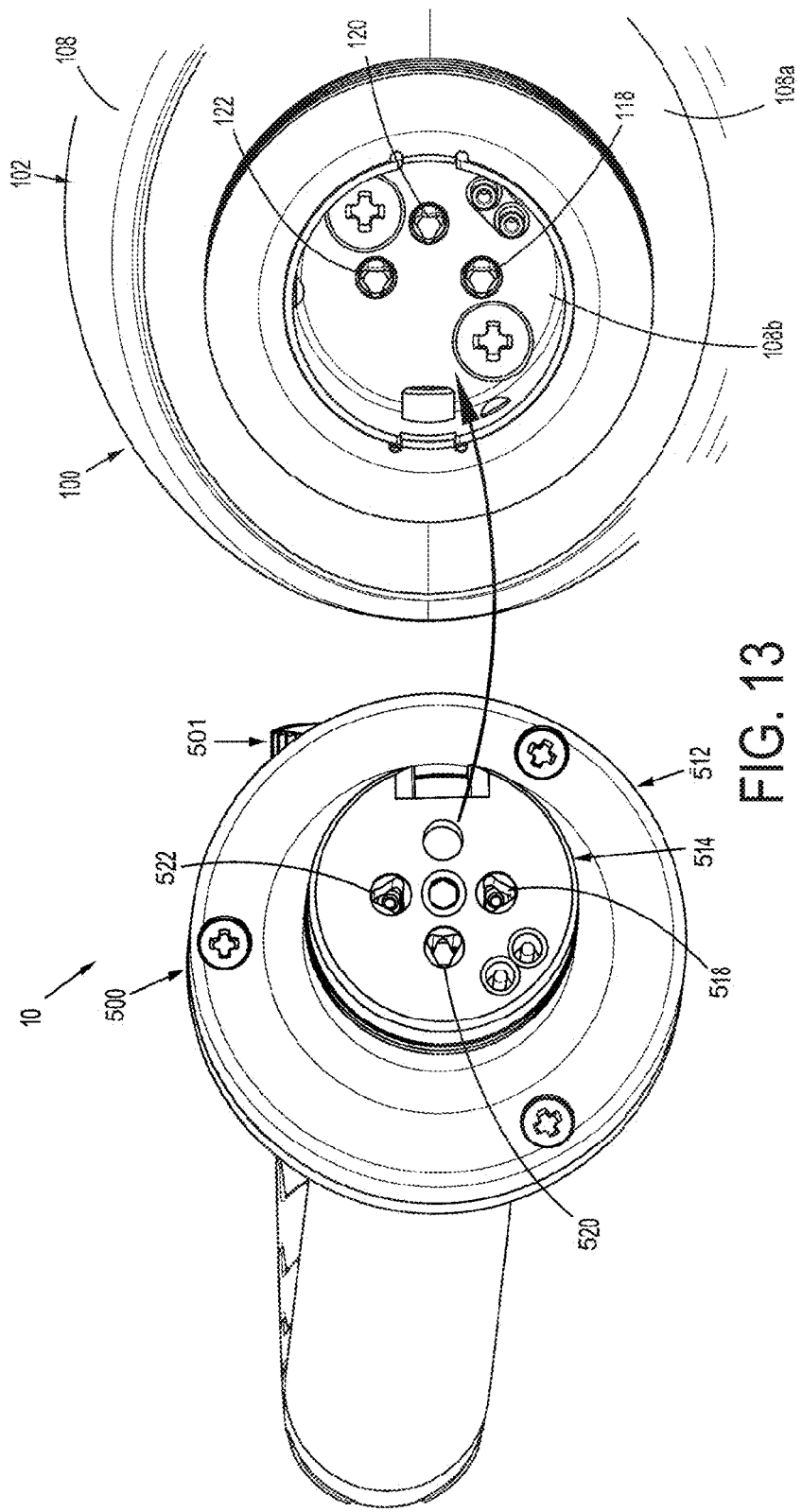
FIG. 13 is a rear, perspective view of a shaft assembly and a powered surgical instrument, of the electromechanical surgical system of FIG. 12, illustrating a connection therebetween, according to at least aspect of the present disclosure.
Figure 14:
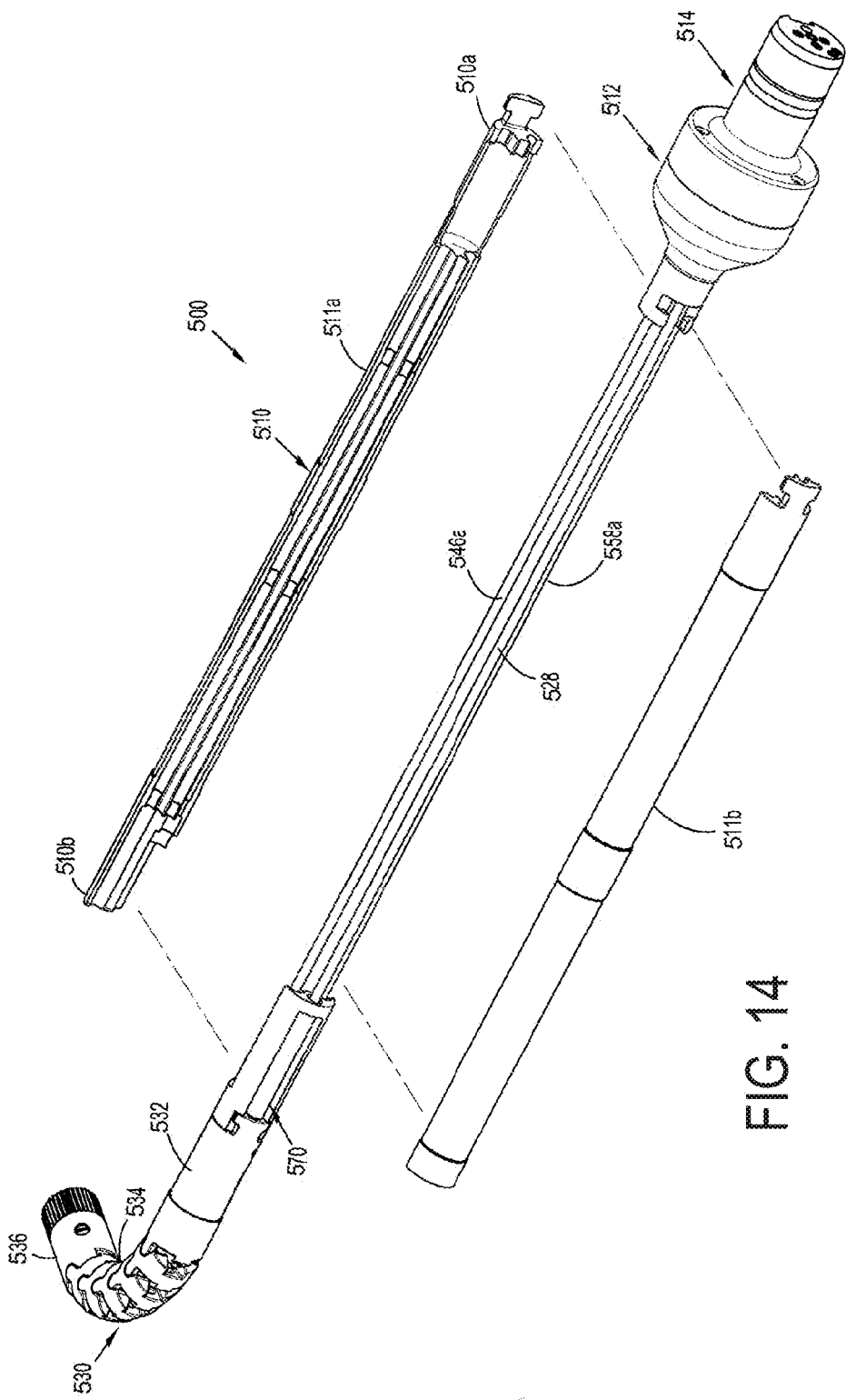
FIG. 14 is a perspective view, with parts separated, of the shaft assembly of FIG. 13, according to at least aspect of the present disclosure.

Referring to FIGS. 12 and 14, the shaft assembly 500 includes an elongate, substantially rigid, outer tubular body 510 having a proximal end 510a and a distal end 510b and a transmission housing 212 connected to proximal end 210a of tubular body 510 and being configured for selective connection to surgical instrument 100. In addition, the shaft assembly 500 further includes an articulating neck assembly 530 connected to distal end 510b of elongate body portion 510.

Figure 15:
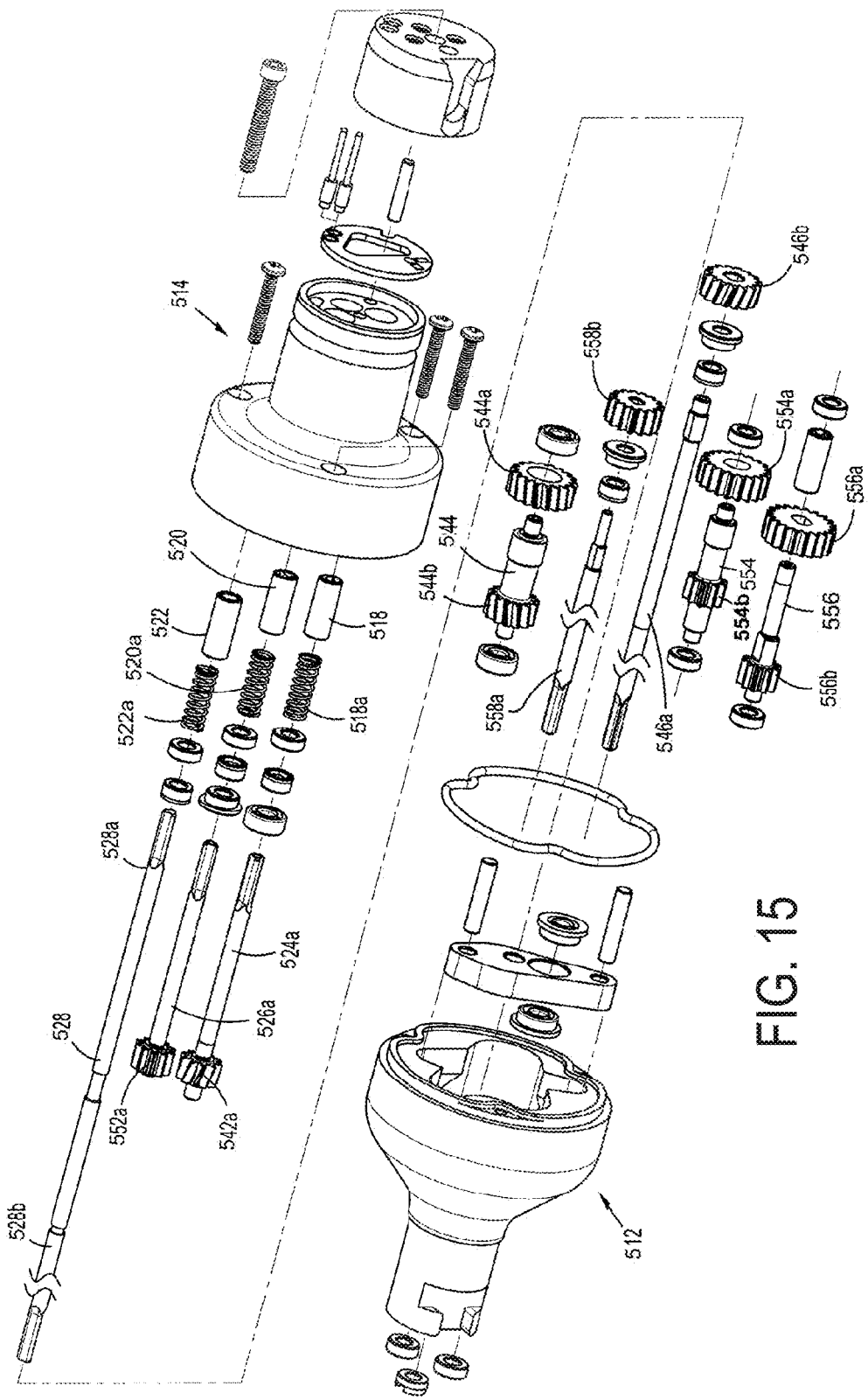
FIG. 15 is a perspective view, with parts separated of a transmission housing of the shaft assembly of FIG. 13, according to at least aspect of the present disclosure.

Transmission housing 512 is configured to house a pair of gear train systems therein for varying a speed/force of rotation (e.g., increase or decrease) of first, second and/or third rotatable drive members or connectors 118, 120, and/or 122 of surgical instrument 100 before transmission of such rotational speed/force to the end effector 501. As seen in FIG. 15, transmission housing 512 and shaft coupling assembly 514 rotatably support a first proximal or input drive shaft 524a, a second proximal or input drive shaft 526a, and a third drive shaft 528.

Shaft drive coupling assembly 514 includes a first, a second and a third biasing member 518a, 520a and 522a disposed distally of respective first, second and third connector sleeves 518, 520, 522. Each of biasing members 518a, 520a and 522a is disposed about respective first proximal drive shaft 524a, second proximal drive shaft 526a, and third drive shaft 228. Biasing members 518a, 520a and 522a act on respective connector sleeves 518, 520 and 522 to help maintain connector sleeves 218, 220 and 222 engaged with the distal end of respective drive rotatable drive members or connectors 118, 120, 122 of surgical instrument 100 when shaft assembly 500 is connected to surgical instrument 100.

Shaft assembly 500 includes a first and a second gear train system 540, 550, respectively, disposed within transmission housing 512 and tubular body 510, and adjacent coupling assembly 514. As mentioned above, each gear train system 540, 550 is configured and adapted to vary a speed/force of rotation (e.g., increase or decrease) of first and second rotatable drive connectors 118 and 120 of surgical instrument 100 before transmission of such rotational speed/force to end effector 501.

Figure 16:
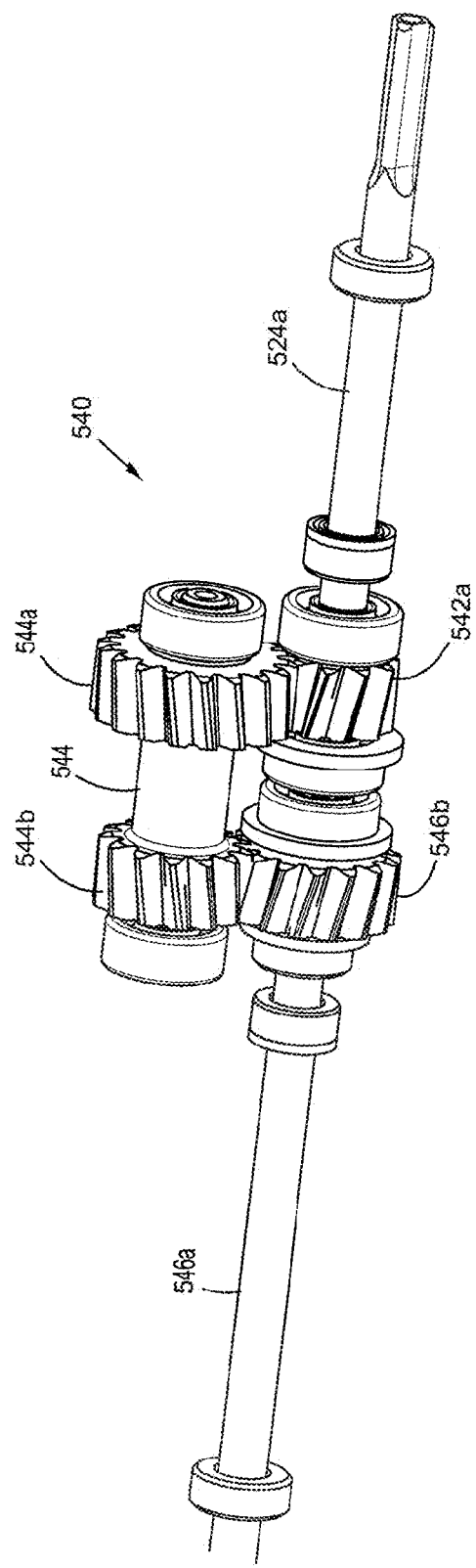
FIG. 16 is a perspective view of a first gear train system that is supported in the transmission housing of FIG. 15, according to at least aspect of the present disclosure.

As illustrated in FIGS. 15 and 16, first gear train system 540 includes first input drive shaft 524a, and a first input drive shaft spur gear 542a keyed to first input drive shaft 524a. First gear train system 540 also includes a first transmission shaft 544 rotatably supported in transmission housing 512, a first input transmission spur gear 544a keyed to first transmission shaft 544 and engaged with first input drive shaft spur gear 542a, and a first output transmission spur gear 544b keyed to first transmission shaft 544. First gear train system 540 further includes a first output drive shaft 546a rotatably supported in transmission housing 512 and tubular body 510, and a first output drive shaft spur gear 546b keyed to first output drive shaft 546a and engaged with first output transmission spur gear 544b.

In at least one instance, the first input drive shaft spur gear 542a includes 10 teeth; first input transmission spur gear 544a includes 18 teeth; first output transmission spur gear 544b includes 13 teeth; and first output drive shaft spur gear 546b includes 15 teeth. As so configured, an input rotation of first input drive shaft 524a is converted to an output rotation of first output drive shaft 546a by a ratio of 1:2.08.

In operation, as first input drive shaft spur gear 542a is rotated, due to a rotation of first connector sleeve 558 and first input drive shaft 524a, as a result of the rotation of the first respective drive connector 118 of surgical instrument 100, first input drive shaft spur gear 542a engages first input transmission spur gear 544a causing first input transmission spur gear 544a to rotate. As first input transmission spur gear 544a rotates, first transmission shaft 544 is rotated and thus causes first output drive shaft spur gear 546b, that is keyed to first transmission shaft 544, to rotate. As first output drive shaft spur gear 546b rotates, since first output drive shaft spur gear 546b is engaged therewith, first output drive shaft spur gear 546b is also rotated. As first output drive shaft spur gear 546b rotates, since first output drive shaft spur gear 546b is keyed to first output drive shaft 546a, first output drive shaft 546a is rotated.

The shaft assembly 500, including the first gear system 540, functions to transmit operative forces from surgical instrument 100 to end effector 501 in order to operate, actuate and/or fire end effector 501.

Figure 17:
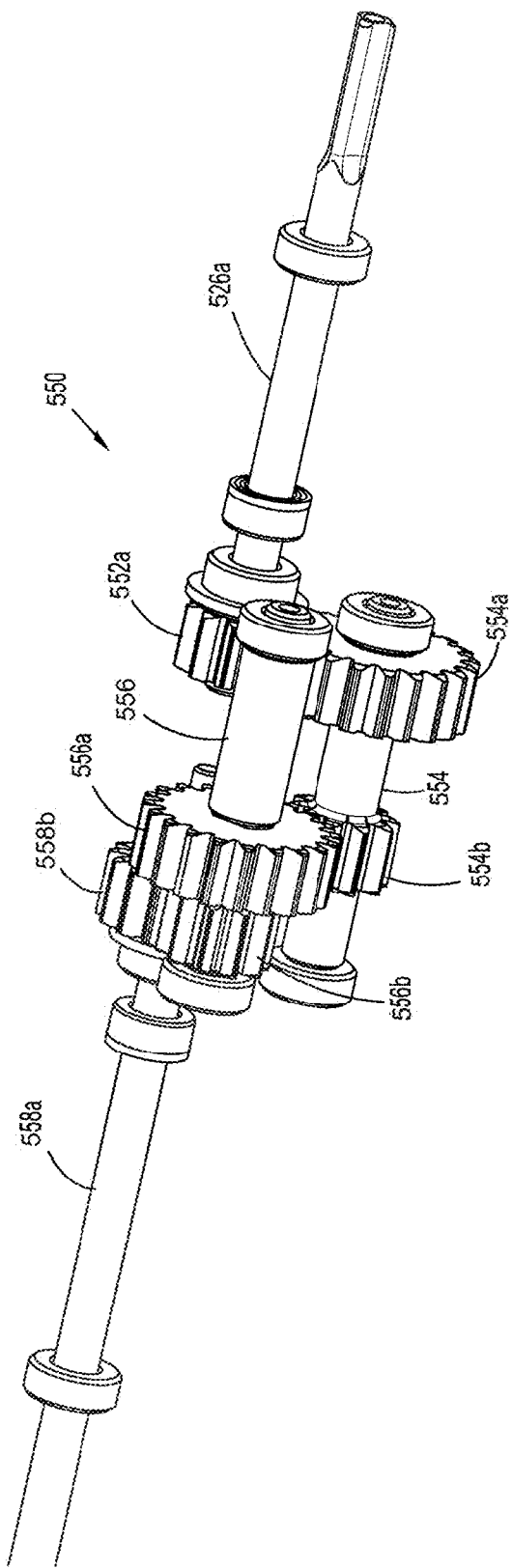
FIG. 17 is a perspective view of a second gear train system that is supported in the transmission housing of FIG. 15, according to at least aspect of the present disclosure.

As illustrated in FIGS. 15 and 17, second gear train system 550 includes second input drive shaft 526a, and a second input drive shaft spur gear 552a keyed to second input drive shaft 526a. Second gear train system 550 also includes a first transmission shaft 554 rotatably supported in transmission housing 512, a first input transmission spur gear 554a keyed to first transmission shaft 554 and engaged with second input drive shaft spur gear 552a, and a first output transmission spur gear 554b keyed to first transmission shaft 554.

Second gear train system 550 further includes a second transmission shaft 556 rotatably supported in transmission housing 512, a second input transmission spur gear 556a keyed to second transmission shaft 556 and engaged with first output transmission spur gear 554b that is keyed to first transmission shaft 554, and a second output transmission spur gear 556b keyed to second transmission shaft 556.

Second gear train system 550 additionally includes a second output drive shaft 558a rotatably supported in transmission housing 512 and tubular body 510, and a second output drive shaft spur gear 558b keyed to second output drive shaft 558a and engaged with second output transmission spur gear 556b.

In at least one instance, the second input drive shaft spur gear 552a includes 10 teeth; first input transmission spur gear 554a includes 20 teeth; first output transmission spur gear 554b includes 10 teeth; second input transmission spur gear 556a includes 20 teeth; second output transmission spur gear 556b includes 10 teeth; and second output drive shaft spur gear 558b includes 15 teeth. As so configured, an input rotation of second input drive shaft 526a is converted to an output rotation of second output drive shaft 558a by a ratio of 1:6.

In operation, as second input drive shaft spur gear 552a is rotated, due to a rotation of second connector sleeve 560 and second input drive shaft 526a, as a result of the rotation of the second respective drive connector 120 of surgical instrument 100, second input drive shaft spur gear 552a engages first input transmission spur gear 554a causing first input transmission spur gear 554a to rotate. As first input transmission spur gear 554a rotates, first transmission shaft 554 is rotated and thus causes first output transmission spur gear 554b, that is keyed to first transmission shaft 554, to rotate. As first output transmission spur gear 554b rotates, since second input transmission spur gear 556a is engaged therewith, second input transmission spur gear 556a is also rotated. As second input transmission spur gear 556a rotates, second transmission shaft 256 is rotated and thus causes second output transmission spur gear 256b, that is keyed to second transmission shaft 556, to rotate. As second output transmission spur gear 556b rotates, since second output drive shaft spur gear 558b is engaged therewith, second output drive shaft spur gear 558b is rotated. As second output drive shaft spur gear 558b rotates, since second output drive shaft spur gear 558b is keyed to second output drive shaft 558a, second output drive shaft 558a is rotated.

The shaft assembly 500, including second gear train system 550, functions to transmit operative forces from surgical instrument 100 to end effector 501 in order rotate shaft assembly 500 and/or end effector 501 relative to surgical instrument 100.

Figure 18:
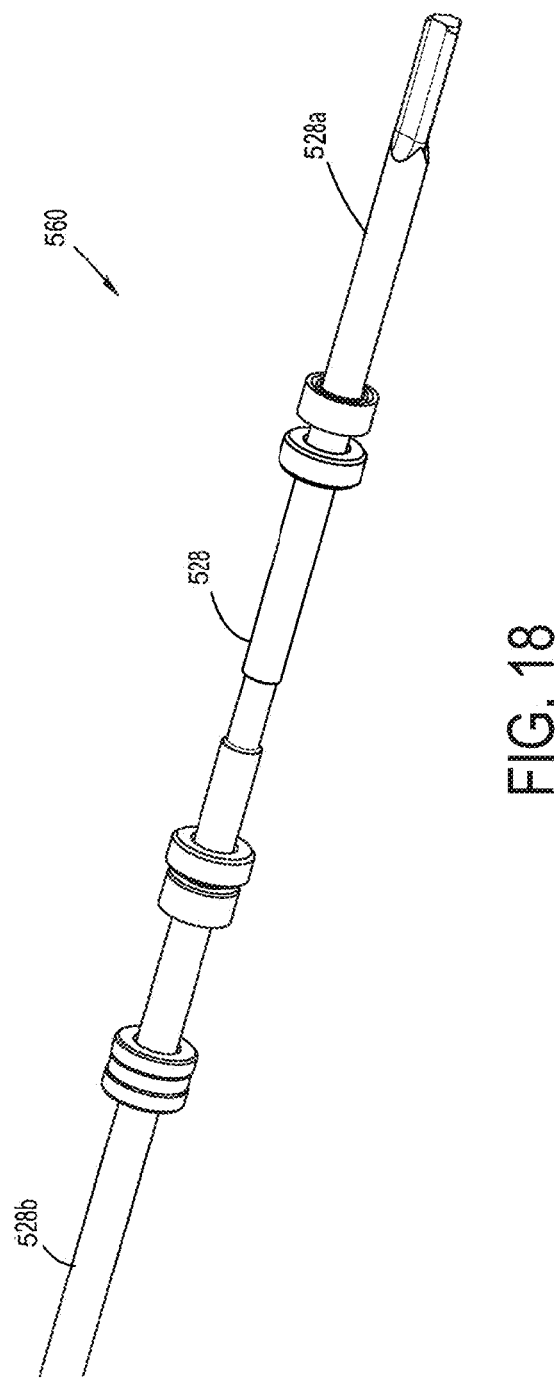
FIG. 18 is a perspective view of a third drive shaft that is supported in the transmission housing of FIG. 15, according to at least aspect of the present disclosure.

As illustrated in FIGS. 15 and 18, the transmission housing 512 and shaft coupling assembly 514 rotatably support a third drive shaft 528. Third drive shaft 528 includes a proximal end 528a configured to support third connector sleeve 522, and a distal end 528b extending to and operatively connected to an articulation assembly 570.

As illustrated in FIG. 14, elongate, outer tubular body 510 of shaft assembly 500 includes a first half section 511a and a second half section 511b defining at least three longitudinally extending channels through outer tubular body 510 when half sections 511a, 511b are mated with one another. The channels are configured and dimensioned to rotatably receive and support first output drive shaft 546a, second output drive shaft 558a, and third drive shaft 528 as first output drive shaft 546a, second output drive shaft 558a, and third drive shaft 528 extend from transmission housing 512 to articulating neck assembly 530. Each of first output drive shaft 546a, second output drive shaft 558a, and third drive shaft 528 are elongate and sufficiently rigid to transmit rotational forces from transmission housing 520 to articulating neck assembly 530.

Turning to FIG. 14, the shaft assembly 500 further includes an articulating neck assembly 530. The articulating neck assembly 530 includes a proximal neck housing 532, a plurality of links 534 connected to and extending in series from proximal neck housing 532; and a distal neck housing 536 connected to and extending from a distal-most link of the plurality of links 534. It is contemplated that, in any of the aspects disclosed herein, that the shaft assembly may have a single link or pivot member for allowing the articulation of the end effector. It is contemplated that, in any of the aspects disclosed herein, that the distal neck housing can be incorporated with the distal most link.

The entire disclosures of:
U.S. Patent Application Publication No. 2014/0110453, filed Oct. 23, 2012, and titled SURGICAL INSTRUMENT WITH RAPID POST EVENT DETECTION, now U.S. Pat. No. 9,265,585;
U.S. Patent Application Publication No. 2013/0282052, filed Jun. 19, 2013, and titled APPARATUS FOR ENDOSCOPIC PROCEDURES, now U.S. Pat. No. 9,480,492; and
U.S. Patent Application Publication No. 2013/0274722, filed May 10, 2013, and titled APPARATUS FOR ENDOSCOPIC PROCEDURES, now U.S. Pat. No. 9,492,146, are hereby incorporated by reference herein.

Figure 19:
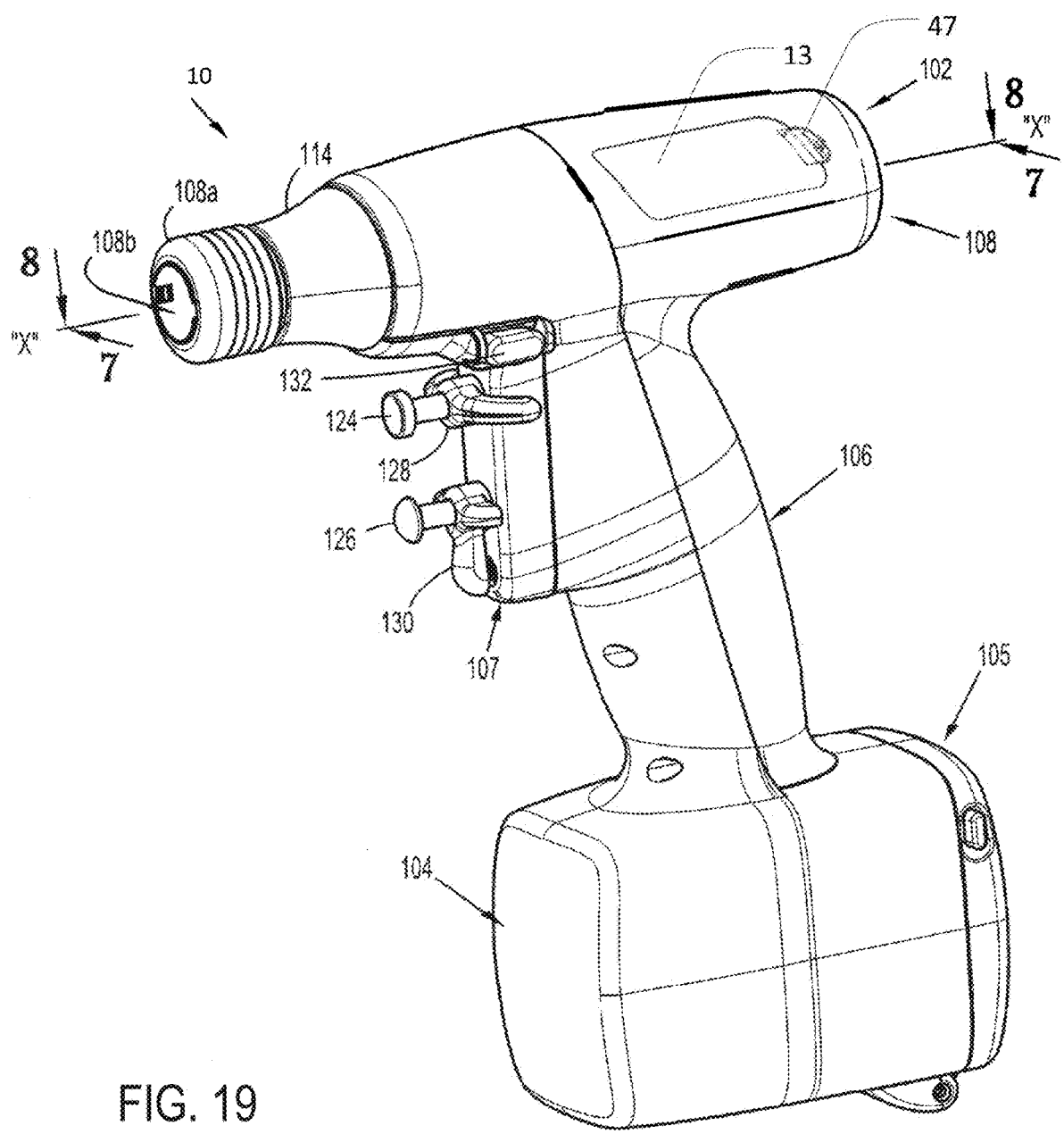
FIG. 19 is a perspective view of a surgical instrument, according to at least one aspect of the present disclosure.
Figure 19A:
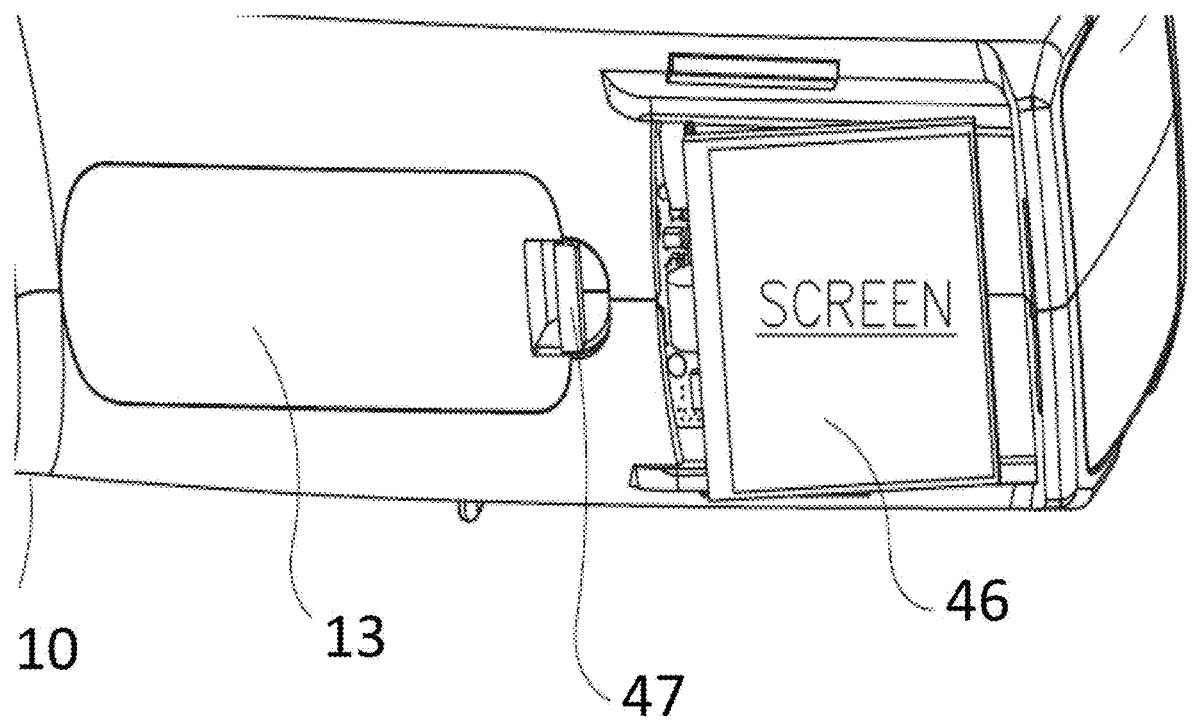
FIG. 19A is a top view of the surgical instrument of FIG. 19, according to at least aspect of the present disclosure.
Figure 19B:
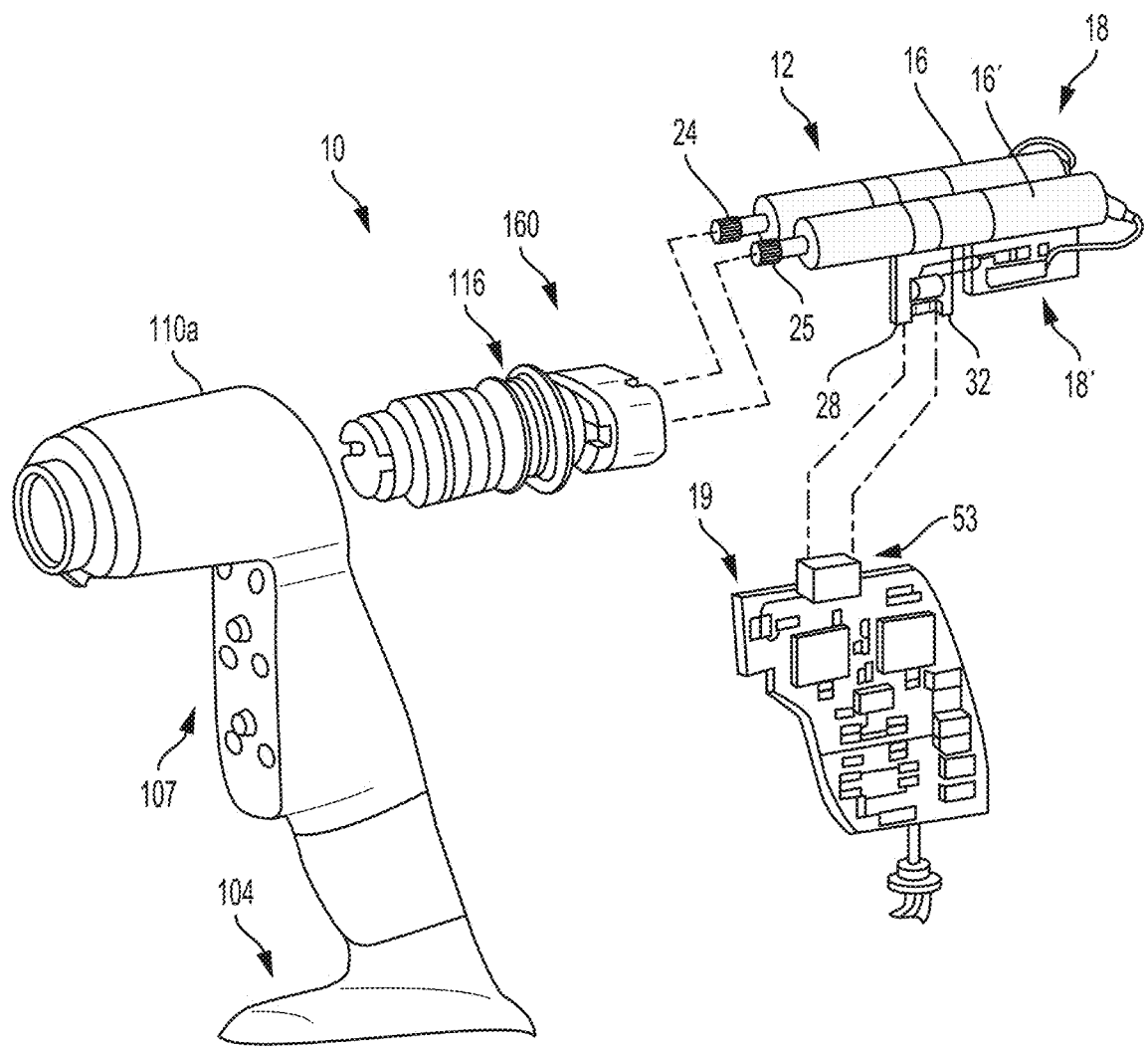
FIG. 19B is a partial exploded view of the surgical instrument of FIG. 19, according to at least aspect of the present disclosure.
Figure 20:
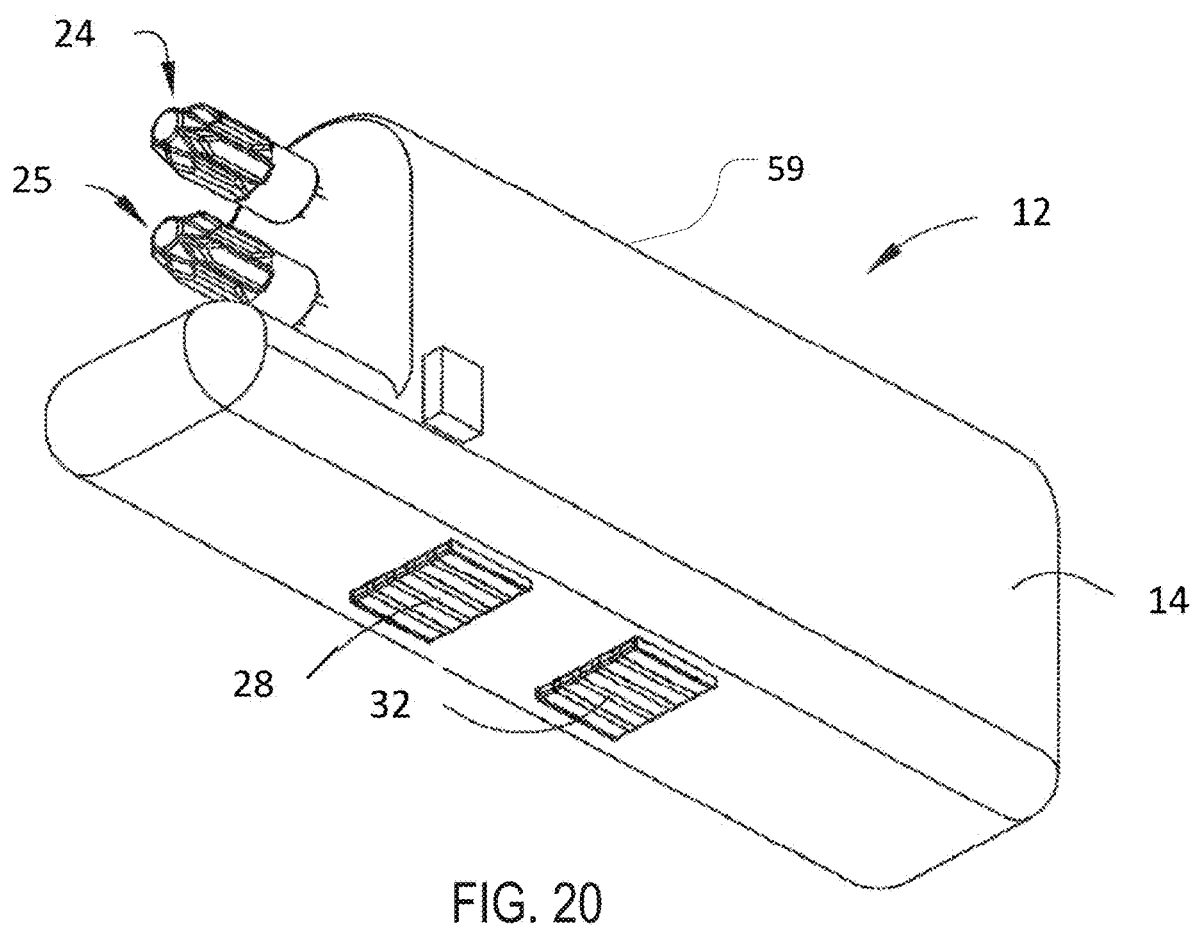
FIG. 20 is a perspective view of a motor cartridge, according to at least aspect of the present disclosure.

Referring to FIGS. 19-19B, a surgical instrument 10 is depicted. The surgical instrument 10 is similar in many respects to the surgical instrument 100. For example, the surgical instrument 10 is configured for selective connection with the end effector or single use loading unit or reload 300 via the adapter 200. Also, the surgical instrument 10 includes the handle housing 102 including the lower housing portion 104, the intermediate housing portion 106, and the upper housing portion 108. In addition, the surgical instrument 10 further includes a replaceable motor cartridge 12, as illustrated in FIG. 20. The motor cartridge 12 is separably couplable to the surgical instrument 10. A motor access door 13 (FIG. 19) can be opened to obtain access to the motor cartridge 12. Once the motor access door 13 is opened, the motor cartridge 12 can be removed and replaced with another motor cartridge.

As described in greater delay below, the surgical instrument 10 is configured to detect a damaged motor cartridge 12 and, in certain instances, instruct an operator of the surgical instrument 10 to replace the damaged motor cartridge 12 with an undamaged motor cartridge 12. The ability to replace a motor cartridge 12 is quite useful at least because it allows for an improved repair capability since a damaged motor cartridge 12 can be readily replaced with an undamaged motor cartridge 12. In absence of the ability to replace a damaged motor cartridge 12, the surgical instrument 10 may be rendered inoperable even though the majority of the components of the surgical instrument 10 are in good operating condition. The ability to replace a motor cartridge 12 is also useful in allowing modularity in new product designs, and simplifying installation of hardware upgrades as part of life cycle improvements. For example, a first generation motor cartridge can be readily replaced with an upgraded second generation motor cartridge. Motor cartridges can also be swapped between surgical instruments that employ the same type of motor cartridge, for example.

The motor cartridge 12 comprises a housing 14 which includes high current components of the surgical instrument 10 such as, for example, at least one motor 16 and at least one motor circuit board 18. Since high current components of the surgical instrument 10 are more susceptible to damage than low current components such as a main control circuit board 19 and various feedback systems, it is desirable to be able to readily replace the high current components by replacing the motor cartridge 12.

Figure 21:
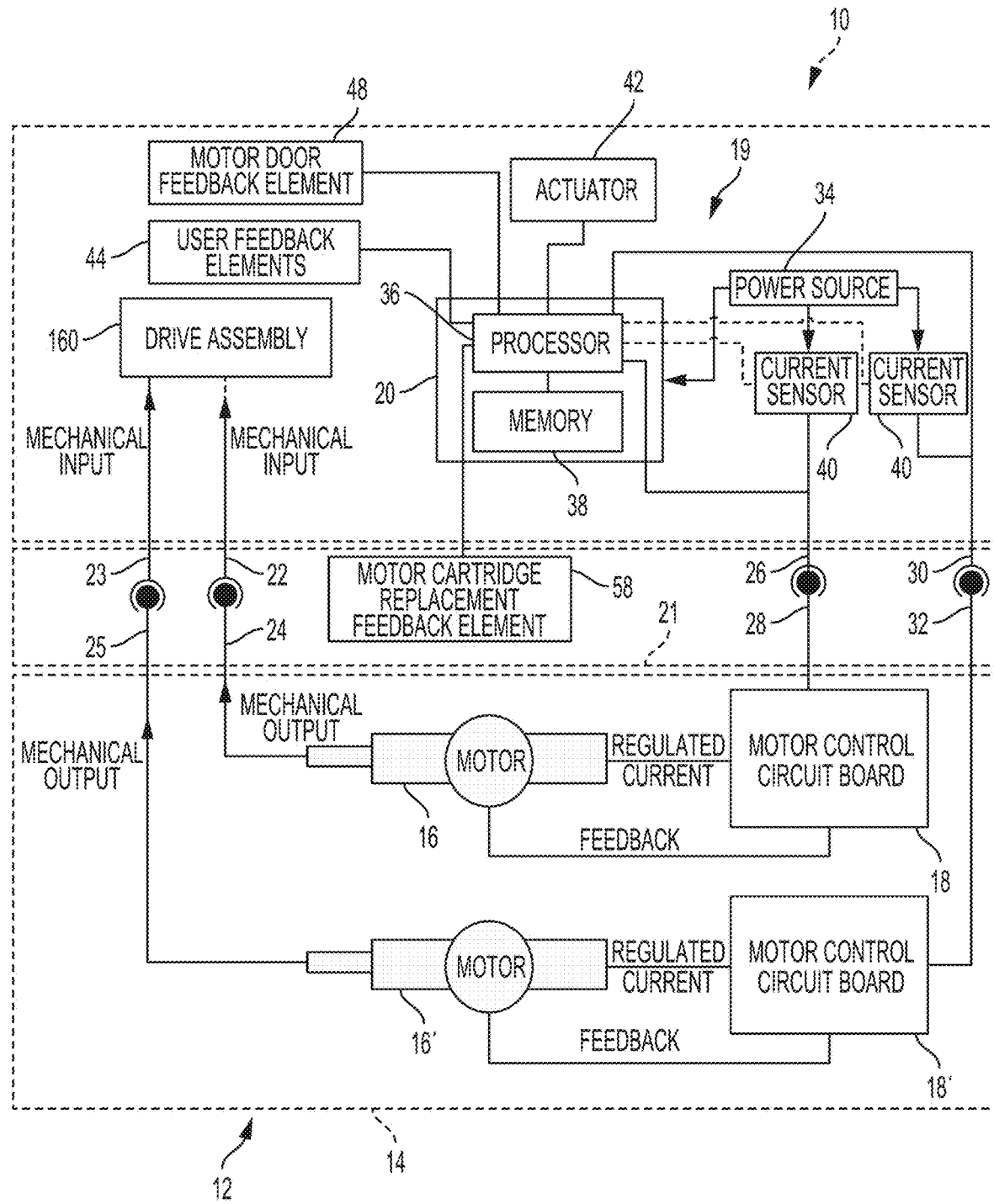
FIG. 21 is a circuit diagram of various components of the surgical instrument of FIG. 20, according to at least aspect of the present disclosure.

As illustrated in FIG. 21, the motor cartridge 12 is releasably coupled to the surgical instrument 10. An interface 21 between the motor cartridge 12 and the surgical instrument 10 comprises a mechanical component represented by mechanical connectors 22, 23, 24, and 25, a power/communication transmission component represented by electrical connectors 26, 28, 30, and 32. In at least one instance, the main control circuit board 19 comprises a receiver 53 which can be in the form of a socket, as illustrated in FIG. 19B. The receiver 53 can be configured to receive the connectors 28 and 32, for example, to electrically couple the main control circuit board 19 to the circuit boards 18 and 18'. In certain instances, the interface 21 may comprise one or more switches which can be activated after coupling engagement of the motor cartridge 12 and the surgical instrument 10. Various suitable connectors are described in U.S. Patent Application Publication No. 2014/0305990, filed Apr. 16, 2013, and titled DRIVE SYSTEM DECOUPLING ARRANGEMENT FOR A SURGICAL INSTRUMENT, now U.S. Pat. No. 10,136,887, which is hereby incorporated by reference herein in its entirety.

In the aspect illustrated in FIG. 21, the motor cartridge 12 includes two motors 16 and 16' which are controlled by separate motor control circuit boards 18 and 18'. Alternatively, the motors 16 and 16' can be controlled by one motor control circuit board. In certain instances, two or more separate motor cartridges can be employed with the surgical instrument 10, wherein each motor cartridge includes at least one motor and at least one motor control circuit board for controlling the at least one motor, for example. For the sake of brevity, the following discussion will focus on the motor 16 and the control circuit board 18; however, the following discussion is also applicable to the motor 16' and the control circuit board 18'.

The motor 16 may be any electrical motor configured to actuate one or more drives (e.g., rotatable drive connector 24 of FIG. 19B). The motor 16 is powered by a power source 34 in the surgical instrument 10. Electrical energy is transmitted to the motor 16 through the interface 21. The power source 34 may be a DC battery (e.g., rechargeable lead-based, nickel-based, lithium-ion based, battery etc.), an AC/DC transformer, or any other power source suitable for providing electrical energy to the motor 16. When the motor cartridge 12 is coupled to the surgical instrument 10, the power source 34 and the motor 16 are coupled to the motor control circuit 18 which controls the operation of the motor 16 including the flow of electrical energy from the power source 34 to the motor 16.

Referring to FIG. 21, the main control circuit board 19 includes a microcontroller 20 ("controller"). In certain instances, the controller 20 may include a microprocessor 36 ("processor") and one or more computer readable mediums or memory units 38 ("memory"). In certain instances, the memory 38 may store various program instructions, which when executed may cause the processor 36 to perform a plurality of functions and/or calculations described herein. The power source 34 can be configured to supply power to the controller 20 and/or other components of the main control circuit board 19, for example.

The controller 20 and/or other controllers of the present disclosure may be implemented using integrated and/or discrete hardware elements, software elements, and/or a combination of both. Examples of integrated hardware elements may include processors, microprocessors, microcontrollers, integrated circuits, ASICs, PLDs, DSPs, FPGAs, logic gates, registers, semiconductor devices, chips, microchips, chip sets, microcontrollers, SoC, and/or SIP. Examples of discrete hardware elements may include circuits and/or circuit elements such as logic gates, field effect transistors, bipolar transistors, resistors, capacitors, inductors, and/or relays. In certain instances, the controller 20 may include a hybrid circuit comprising discrete and integrated circuit elements or components on one or more substrates, for example.

In certain instances, the controller 20 and/or other controllers of the present disclosure may be an LM 4F230H5QR, available from Texas Instruments, for example. In certain instances, the Texas Instruments LM4F230H5QR is an ARM Cortex-M4F Processor Core comprising on-chip memory of 256 KB single-cycle flash memory, or other non-volatile memory, up to 40 MHz, a prefetch buffer to improve performance above 40 MHz, a 32 KB single-cycle SRAM, internal ROM loaded with StellarisWare® software, 2 KB EEPROM, one or more PWM modules, one or more QEI analog, one or more 12-bit ADC with 12 analog input channels, among other features that are readily available. Other microcontrollers may be readily substituted for use with the present disclosure. Accordingly, the present disclosure should not be limited in this context.

In various instances, one or more of the various steps described herein can be performed by a finite state machine comprising either a combinational logic circuit or a sequential logic circuit, where either the combinational logic circuit or the sequential logic circuit is coupled to at least one memory circuit. The at least one memory circuit stores a current state of the finite state machine. The combinational or sequential logic circuit is configured to cause the finite state machine to the steps. The sequential logic circuit may be synchronous or asynchronous. In other instances, one or more of the various steps described herein can be performed by a circuit that includes a combination of the processor 36 and the finite state machine, for example.

Figure 22:
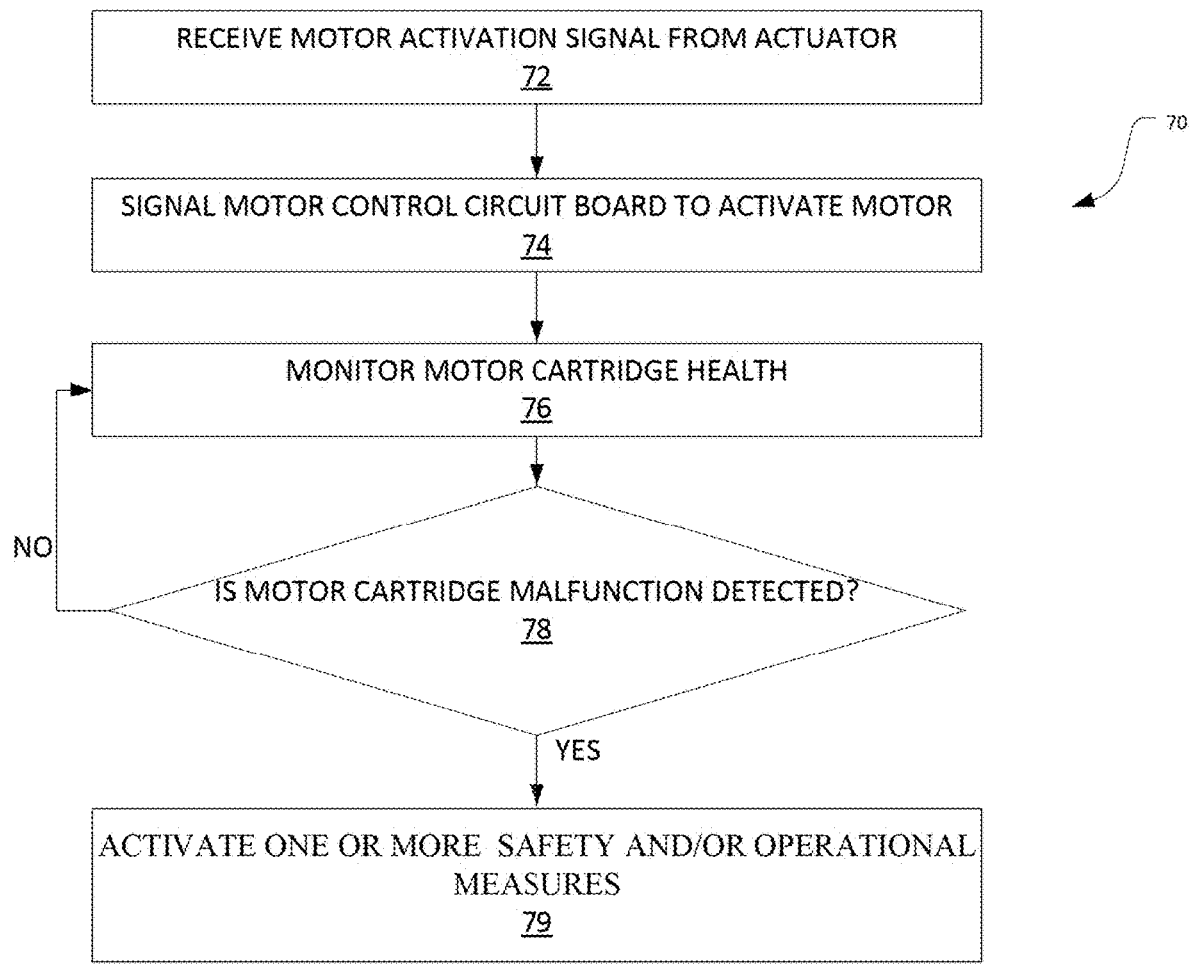
FIG. 22 is a logic diagram outlining a method of monitoring the health of a motor cartridge, according to at least aspect of the present disclosure.

Referring to FIG. 22, FIG. 22 is a logic diagram 70 representative of possible operations that can be implemented by the surgical instrument 10, for example, to monitor the health of a motor cartridge 12 and respond to a detected motor cartridge malfunction. A motor activation signal can be received 72 by the processor 36 from an actuator 42 of the surgical instrument 10. The actuator 42 can be a switch that is configured to close or open a circuit upon actuation of the actuator 42. The closure or opening of the circuit can signal the processor 36 that the actuator 42 has been actuated. In at least one instance, the actuator 42 can be in the form of a firing trigger which can be actuated by an operator to activate a firing sequence of the surgical instrument 10, for example. In another instance, the actuator 42 can be in the form of a closure trigger which can be actuated by an operator to close an end effector 300 of the surgical instrument 10, for example. In another instance, the actuator 42 can be in the form of a rotation trigger which can be actuated by an operator to rotate an end effector 300 of the surgical instrument 10, for example.

Upon receipt of the activation signal, the processor 36 may signal 74 the motor control circuit board 18 to activate the motor 16. The health of the motor cartridge 12 can be continuously monitored 76 while the actuator 42 is actuated. Under normal operating conditions, as illustrated in FIG. 21, the motor 16 draws current from the power source 34 and generates rotational motion(s) that are transmitted through the interface 21 to the drive mechanism 160 in response to the actuation of the actuator 42. If, however, a malfunction in the motor cartridge 12 is detected 78, one or more safety and/or operational measures can be activated 79, as described in greater detail below. Otherwise, the motor cartridge health is continuously monitored 76 while the actuator 42 is actuated until a malfunction is detected 78.

Figure 23:
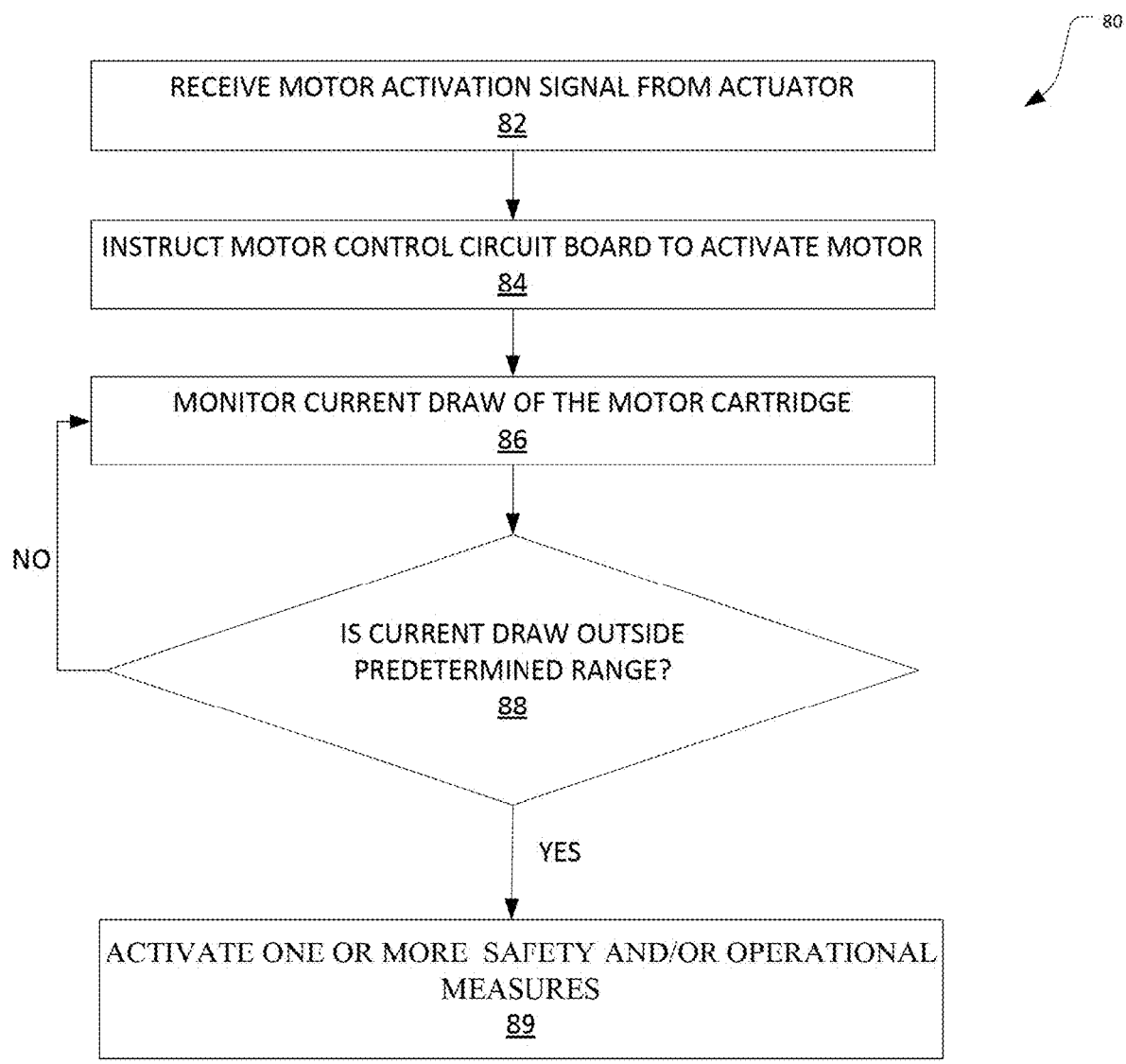
FIG. 23 is a logic diagram outlining a method that employs a current sensor to monitor the health of a motor cartridge, according to at least aspect of the present disclosure.

Referring to FIG. 23, FIG. 23 is a logic diagram 80 representative of possible operations that can be implemented by the surgical instrument 10, for example, to monitor the health of a motor cartridge 12 and respond to a detected motor cartridge malfunction. A motor activation signal can be received 82 by the processor 36 from an actuator 42 of the surgical instrument 10. Upon receipt of the activation signal, the processor 36 may signal 84 the motor control circuit board 18 to activate the motor 16. At 86, the health of the motor cartridge 12 can be continuously monitored, while the actuator 42 is actuated, by monitoring the current draw of the motor cartridge 12. As illustrated in FIG. 21, the current draw of the motor cartridge 12 can be monitored by one or more current sensors 40. Sensed current readings can be communicated to the processor 36 by the current sensor 40. At 88, if the current draw of the motor cartridge 12, while the actuator 42 is actuated, becomes outside a predetermined value or range, the processor 36 can conclude that a malfunction of the motor cartridge 12 is detected 88. If a malfunction in the motor cartridge 12 is detected 88, one or more safety and/or operational measures can be activated 89, as described in greater detail below. Otherwise, the motor cartridge health is continuously monitored 86 while the actuator 42 is actuated until a malfunction is detected 88.

The predetermined value or range can be stored in the memory 38, for example. In the event a predetermined range is stored in the memory 38, the processor 36 may access the memory 38 to compare a current reading, or an average of a plurality of current readings, of the current sensor 40 to the predetermined range. If the current reading is greater than or equal to a maximum value of the predetermined range, the processor 36 may conclude that a malfunction of the motor cartridge 12 is detected 88. Also, if the current reading is less than or equal a minimum value of the predetermined range, the processor 36 may conclude that a malfunction of the motor cartridge 12 is detected 88.

Likewise, in the event a stored value is stored in the memory 38, the processor 36 may access the memory 38 to compare a current reading, or an average of a plurality of current readings, of the current sensor 40 to the predetermined value. If the current reading is greater than or equal to the predetermined value, for example, or less than or equal to the predetermined value, for example, the processor 36 may conclude that a malfunction of the motor cartridge 12 is detected 88.

In at least one instance, the processor 36 may conclude that a malfunction of the motor cartridge 12 is detected if the current draw of the motor cartridge 12, while the actuator 42 is activated, is less than or equal to 10% of the predetermined value. In at least one instance, the processor 36 may conclude that a malfunction of the motor cartridge 12 is detected if the current draw of the motor cartridge 12, while the actuator 42 is activated, is less than or equal to 20% of the predetermined value. In at least one instance, the processor 36 may conclude that a malfunction of the motor cartridge 12 is detected if the current draw of the motor cartridge 12, while the actuator 42 is actuated, is greater than or equal to 150% of the predetermined value. In at least one instance, the processor 36 may conclude that a malfunction of the motor cartridge 12 is detected if the current draw of the motor cartridge 12, while the actuator 42 is actuated, is greater than or equal to 200% of the predetermined value.

As indicated above, the processor 36 can be configured to respond to a detected malfunction of the motor cartridge 12 by activating (79 and 89) one or more safety and/or operational measures. For example, the processor 36 may employ one or more feedback elements 44 to issue an alert to an operator of the surgical instrument 100. In certain instances, the feedback elements 44 may comprise one or more visual feedback systems such as display screens, backlights, and/or LEDs, for example. In certain instances, the feedback elements 44 may comprise one or more audio feedback systems such as speakers and/or buzzers, for example. In certain instances, the feedback elements 44 may comprise one or more haptic feedback systems, for example. In certain instances, the feedback elements 44 may comprise combinations of visual, audio, and/or haptic feedback systems, for example.

Further to the above, the processor 36 may employ a feedback screen 46 (FIG. 19B) of the surgical instrument 10 to provide instructions to an operator for how to replace the motor cartridge 12, for example. In addition, the processor 36 may respond to a detected malfunction of the motor cartridge 12 by storing or recording a damaged status of the motor cartridge 12 in the memory 38.

In at least one instance, the processor 36 may disable the surgical instrument 10 until the damaged motor cartridge 12 is replaced with an undamaged motor cartridge. For example, the memory 38 may include program instructions, which when executed by the processor 36 in response to a detected malfunction of the motor cartridge 12, may cause the processor 36 to ignore input from the actuator 42 until the damaged motor cartridge 12 is replaced. A motor cartridge replacement feedback element 58 can be employed to alert the processor 36 when the motor cartridge 12 is replaced, as described in greater detail below.

Referring primarily to FIGS. 19A and 21, the surgical instrument 10 may include a motor access door 13. The motor access door 13 can be releasably locked to the handle housing 102 to control access to the motor cartridge 12. As illustrated in FIG. 19A, the motor access door 13 may include a locking mechanism such as, for example, a snap-type locking mechanism 47 for locking engagement with the handle housing 102. Other locking mechanisms for locking the motor access door 13 to the handle housing 102 are contemplated by the present disclosure. In use, a clinician may obtain access to the motor cartridge 12 by unlocking the locking mechanism 47 and opening the motor access door 13. In at least one example, the motor access door 13 can be separably coupled to the handle housing 102 and can be detached from the handle housing 102 to provide access to the motor access door 13, for example. In another example, the motor access door 13 can be pivotally coupled to the handle housing 102 via hinges (not shown) and can be pivoted relative to the handle housing 102 to provide access to the motor access door 13, for example. In yet another example, the motor access door 13 can be a sliding door which can be slidably movable relative to the handle housing 102 to provide access to the motor access door 13.

Referring again to FIG. 21, in certain instances, a motor door feedback element 48 can be configured to alert the processor 36 that the locking mechanism 47 is unlocked. In at least one example, the motor door feedback element 48 may comprise a switch circuit (not shown) operably coupled to the processor 36; the switch circuit can be configured to be transitioned to an open configuration when the locking mechanism 47 is unlocked by a clinician and/or transitioned to a closed configuration when the locking mechanism 47 is locked by the clinician, for example. In at least one example, the motor door feedback element 48 may comprise at least one sensor (not shown) operably coupled to the processor 36; the sensor can be configured to be triggered when the locking mechanism 47 is transitioned to unlocked and/or locked configurations by the clinician, for example. The motor door feedback element 48 may include other means for detecting the locking and/or unlocking of the locking mechanism 47 by the clinician.

Figure 24:
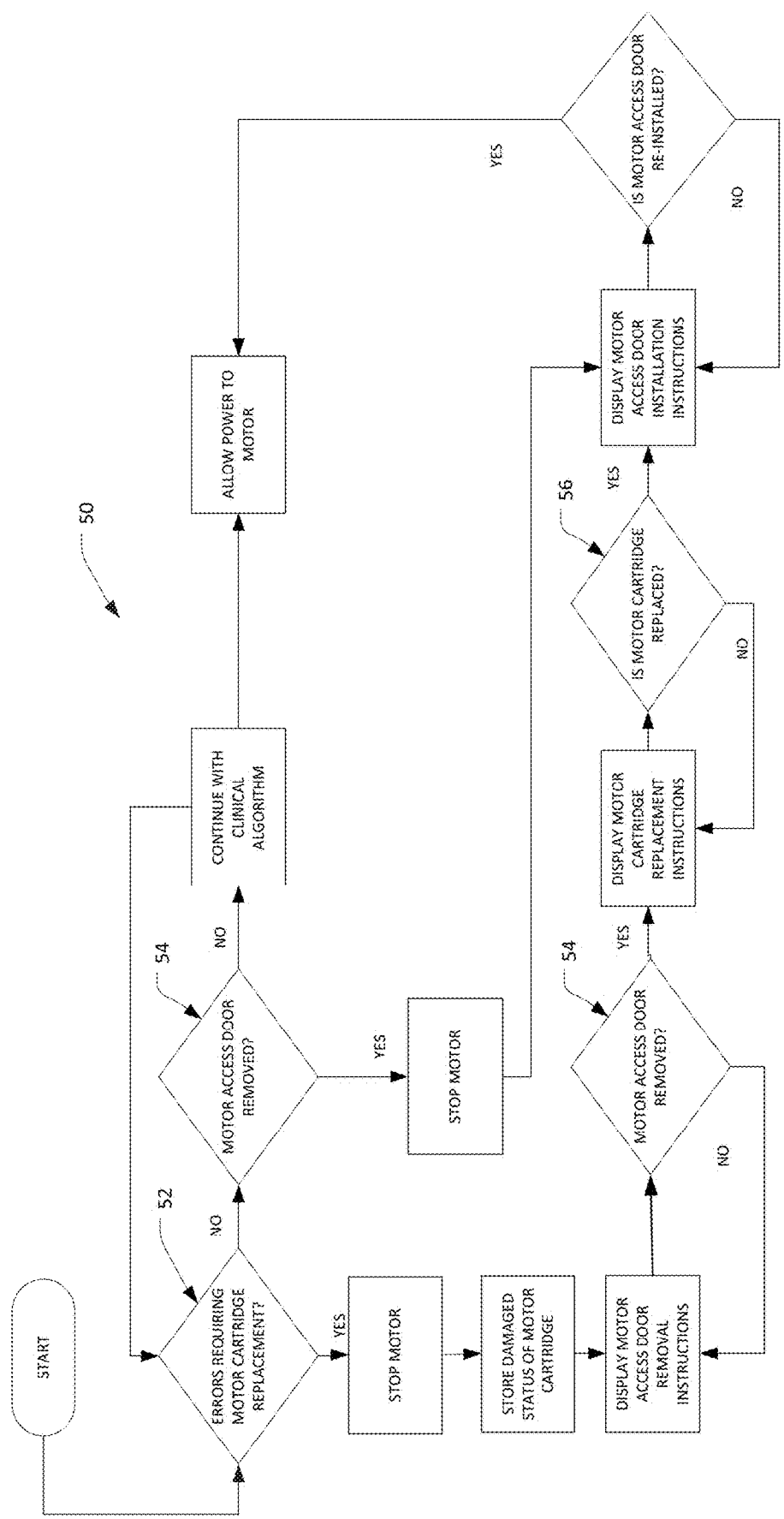
FIG. 24 is a logic diagram outlining a module of the surgical instrument of FIG. 20, according to at least aspect of the present disclosure.

Referring to FIGS. 21 and 24, the controller 20 may comprise one or more embedded applications implemented as firmware, software, hardware, or any combination thereof. In certain instances, the controller 20 may comprise various executable modules such as software, programs, data, drivers, and/or application program interfaces (APIs), for example. FIG. 24 depicts an example module 50 that can be stored in the memory 38, for example. The module 50 can be executed by the processor 36, for example, to alert, guide, and/or provide feedback to a user of the surgical instrument 10 with regard to replacing a motor cartridge 12.

As illustrated in FIG. 24, the module 50 is executed by the processor 36 to provide the user with instructions as to how to replace a motor cartridge 12, for example. In various instances, the module 50 may comprise one or more decision-making steps such as, for example, a decision-making step 52 with regard to the detection of one or more errors requiring replacement of the motor cartridge 12. In at least one instance, as described above in greater detail, the processor 36 is configured to detect an error requiring replacement of the motor cartridge 12 when the current draw of the motor cartridge 12, while the actuator 42 is actuated, is outside a predetermined range, for example.

Figure 25:
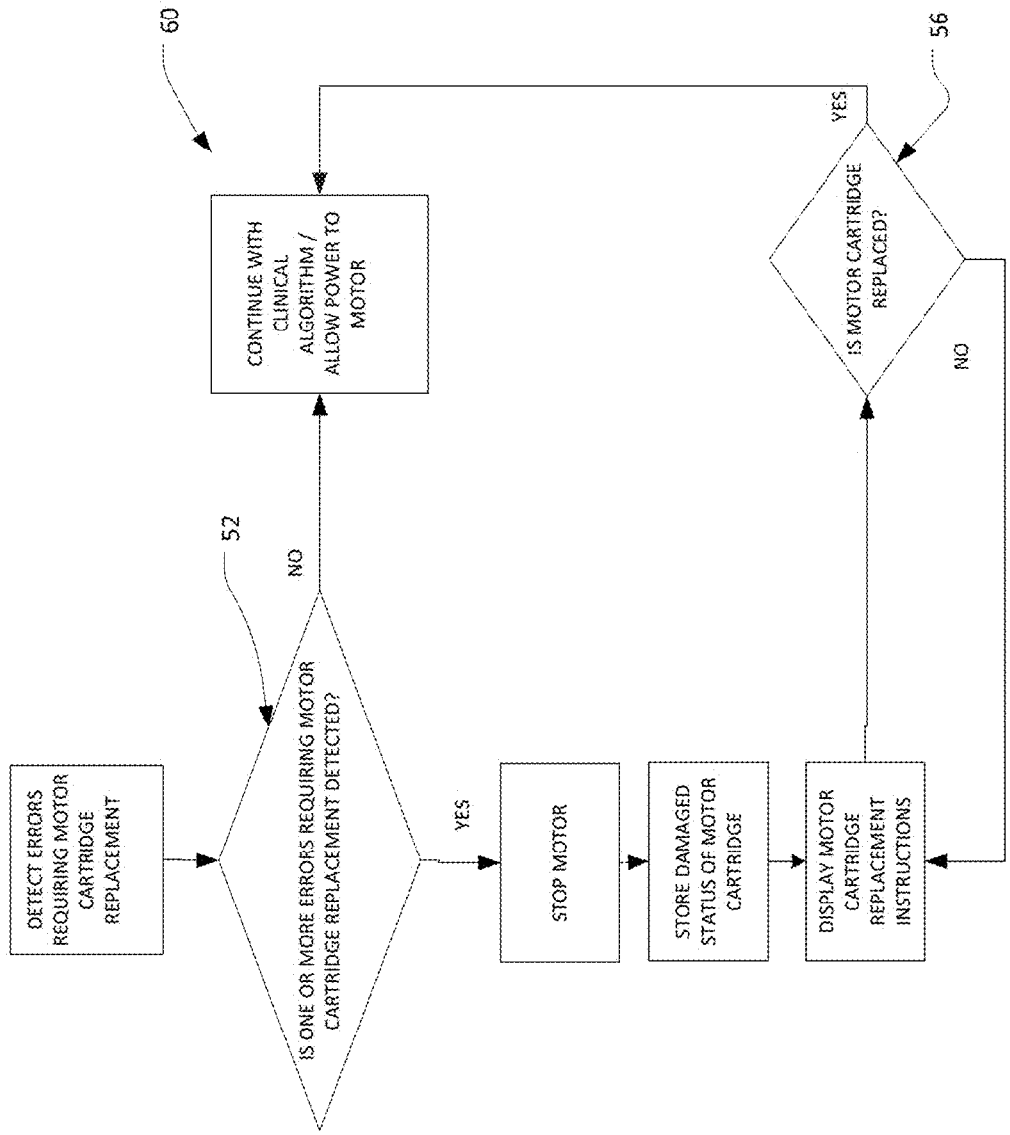
FIG. 25 is a logic diagram outlining a module of the surgical instrument of FIG. 20, according to at least aspect of the present disclosure.

When the processor 36 detects an error in the decision-making step 52, the processor 36 may respond by stopping and/or disabling the motor 16, for example. In addition, in certain instances, the processor 36 may also store a damaged status of the motor cartridge 12 in the memory 38 after detecting the motor cartridge error, as illustrated in FIG. 25. As described above, the memory 38 can be a non-volatile memory which may preserve the stored status when the surgical instrument 10 is reset by the user, for example. In various instances, the motor 16 can be stopped and/or disabled by disconnecting the power source 34 from the motor 16, for example. In various instances, the main control circuit board 19 may include a motor override circuit which can be employed by the processor 36 to stop power delivery to the motor cartridge 12, for example. The step of stopping the motor 16 and/or stopping power delivery to the motor cartridge 12 can be advantageous in preventing, or at least reducing, the possibility of further damage to the surgical instrument 10, for example.

Further to the above, referring still to FIG. 24, the module 50 may include a decision-making step 54 for detecting whether the motor access door 13 is removed. As described above, the processor 36 can be operationally coupled to the motor door feedback element 48 which can be configured to alert the processor 36 as to whether the motor access door 13 is removed. In certain instances, the processor 36 can be programmed to detect that the motor access door 13 is removed when the motor door feedback element 48 reports that the locking mechanism 47 is unlocked, for example. In certain instances, the processor 36 can be programmed to detect that the motor access door 13 is removed when the motor door feedback element 48 reports that the motor access door 13 is opened, for example. In certain instances, the processor 36 can be programmed to detect that the motor access door 13 is removed when the motor door feedback element 48 reports that the locking mechanism 47 is unlocked and that the motor access door 13 is opened, for example.

Referring still to FIG. 24, when the processor 36 does not detect a motor cartridge error in the decision-making step 52 and does not detect that the motor access door 13 is removed in the decision-making step 54, the processor 36 may not interrupt the normal operation of the surgical instrument 10 and may proceed with various clinical algorithms. However, the processor 36 may continue to detect errors requiring replacement of the motor cartridge 12.

In certain instances, when the processor 36 does not detect a motor cartridge error in the decision-making step 52 but detects that the motor access door 13 is removed in the decision-making step 54, the processor 36 may respond by stopping and/or disabling the motor 16, as described above. In addition, the processor 36 may also provide the user with instructions to reinstall the motor access door 13. In certain instances, when the processor 36 detects that the motor access door 13 is reinstalled, while no motor cartridge error is detected, the processor 36 can be configured to reconnect the power to the motor 16 and allow the user to continue with clinical algorithms, as illustrated in FIG. 24.

Further to the above, when the processor 36 detects a motor cartridge error and further detects removal of the motor access door 13, the processor 36 can signal the user to replace the motor cartridge 12 by providing the user with a visual, audio, and/or tactile feedback, for example. In certain instances, the processor 36 can signal the user of the surgical instrument 10 to replace the motor cartridge 12 by flashing a backlight of the feedback screen 46. In any event, the processor 36 may provide the user with instructions to replace the motor cartridge 12, as illustrated in FIG. 24.

Referring again to FIG. 24, in various instances, the instructions provided by the processor 36 to the user to remove the motor access door 13 and/or to replace the motor cartridge 12 may comprise one or more steps; the steps may be presented to the user in a chronological order. The steps may comprise actions to be performed by the user. In such instances, the user may proceed through the steps by performing the actions presented in each of the steps. In certain instances, the actions required in one or more of the steps can be presented to the user in the form of animated images displayed on the feedback screen 46 (FIG. 19B), for example. In certain instances, one or more of the steps can be presented to the user as messages which may include words, symbols, and/or images.

Further to the above, referring still to FIG. 24, the module 50 may include a decision-making step 56 for detecting whether the motor cartridge 12 has been replaced. In at least one instance, the user of the surgical instrument 10 is requested to alert the processor 36 when the motor cartridge 12 has been replaced using one or more of the user feedback elements 44, for example. Alternatively, as illustrated in FIG. 21, the processor 36 can be operationally coupled to a motor cartridge replacement feedback element 58 which can be configured to alert the processor 36 when the motor cartridge 12 is replaced. In at least one instance, the motor cartridge replacement feedback element 58 includes one or more sensors and/or switches which can be triggered when the motor cartridge 12 is removed and/or replaced to alert the processor 36 when the motor cartridge 12 has been removed and/or replaced.

In at least one instance, the motor cartridge replacement feedback element 58 includes a pressure sensor positioned at the interface 21 between the surgical instrument 10 and the motor cartridge 12. The processor 36 can be configured to employ the pressure sensor of the motor cartridge replacement feedback element 58 to detect when the motor cartridge 12 has been removed and/or replaced. In at least one instance, the processor 36 can be configured to employ the pressure sensor of the motor cartridge replacement feedback element 58 to detect a threshold-setting pressure reading when the motor cartridge 12 is installed with the surgical instrument 10. The threshold-setting pressure reading can be used to set a predetermined threshold which can be stored in the memory 38. Alternatively, the predetermined threshold can be calculated and stored in the memory 36 independent of any readings obtained by the pressure sensor.

Further to the above, the processor 36 can be configured to conclude that an installed motor cartridge 12 has been removed when one or more pressure readings detected by the pressure sensor of the motor cartridge replacement feedback element 58 are less than or equal to the predetermined threshold. The processor 36 can also be configured to conclude that a replacement motor cartridge 12 has been installed when subsequent pressure readings detected by the pressure sensor of the motor cartridge replacement feedback element 58 become greater than or equal to the predetermined threshold, for example.

Further to the above, still referring to FIG. 24, once it is determined that the motor cartridge 12 has been replaced, the processor 36 can be configured to instruct the user to reinstall the motor access door 13. Upon subsequent detection that the motor access door 13 has been installed, the processor 36 can be configured to allow power transmission to the installed replacement motor cartridge 12. In certain instances, the processor 36 is further configured to employ one or more of the user feedback elements 44 to alert the use of successful installation of the replacement motor cartridge 12 and/or that the surgical instrument 10 is now ready to continue with various clinical algorithms.

In various instances, the motor access door 13 can be replaced with a motor access member or a motor securement member configured to secure the motor cartridge 12 to the handle housing 102. Alternatively, the motor access door 13 can be removed completely or integrated into the housing 14 of the motor cartridge 12 such that the motor cartridge 12 can be readily removed or separated from the surgical instrument 10 by pulling or retracting the motor cartridge 12 away from the handle housing 102, for example. In at least one instance, in the absence of a motor access door, an outer wall 59 (FIG. 20) of the housing 14 of the motor cartridge 12 can be configured to form a portion of an outer wall of the handle housing 102 of the surgical instrument 10 when the motor cartridge 12 is installed with the surgical instrument 10. In such instances, the outer wall 59 may include an attachment portion (not shown) that can be grabbed by a user of the surgical instrument and pulled to facilitate separating the motor cartridge 12 from the handle housing 102, for example.

FIG. 25 depicts an example module 60 which can be stored in the memory 38, for example. The module 60 is similar in many respects to the module 50. For example, the module 60 can also be executed by the processor 36, for example, to alert, guide, and/or provide feedback to a user of the surgical instrument 10 with regard to replacing a motor cartridge 12; however, the module 60 is implemented when the a motor access door feature is not used.

As illustrated in FIG. 24, the module 50 is executed by the processor 36 to provide the user with instructions as to how to replace a motor cartridge 12, for example. In various instances, the module 50 may comprise one or more decision-making steps such as, for example, a decision-making step 52 with regard to the detection of one or more errors requiring replacement of the motor cartridge 12. In at least one instance, as described above in greater detail, the processor 36 is configured to detect an error requiring replacement of the motor cartridge 12 when the current draw of the motor cartridge 12, while the actuator 42 is activated, is outside a predetermined range, for example.

Like the module 50, the module 60 also includes one or more decision-making steps such as, for example, the decision-making step 52 with regard to the detection of one or more errors requiring replacement of the motor cartridge 12. When the processor 36 detects an error in the decision-making step 52, the processor 36 may respond by stopping and/or disabling the motor 16, for example. In addition, in certain instances, the processor 36 also may store a damaged status of the motor cartridge 12 in the memory 38 after detecting the motor cartridge error, as illustrated in FIG. 25.

Further to the above, when the processor 36 detects a motor cartridge error, the processor 36 can signal the user to replace the motor cartridge 12 by providing the user with a visual, audio, and/or tactile feedback, for example. In certain instances, the processor 36 can signal the user of the surgical instrument 10 to replace the motor cartridge 12 by flashing a backlight of the feedback screen 46. In any event, the processor 36 may provide the user with instructions to replace the motor cartridge 12, as illustrated in FIG. 25. Furthermore, the module 60 includes the decision-making step 56 for detecting whether the motor cartridge 12 has been replaced, as describe above in greater detail. In addition, once it is determined that the motor cartridge 12 has been replaced, the processor 36 can be configured to allow power transmission to the installed replacement motor cartridge 12. The processor 36 can be further configured to employ one or more of the user feedback elements 44 to alert the user of successful installation of the replacement motor cartridge 12.

While various details have been set forth in the foregoing description, it will be appreciated that the various aspects of the surgical instruments with separable motors and motor control circuits may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect" or "an aspect," means that a particular feature, structure, or characteristic described in connection with the aspect is included in at least one aspect. Thus, appearances of the phrases "in one aspect" or "in an aspect" in various places throughout the specification are not necessarily all referring to the same aspect. Furthermore, the particular features, structures or characteristics may be combined in any suitable manner in one or more aspects.

Although various aspects have been described herein, many modifications, variations, substitutions, changes, and equivalents to those aspects may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed aspects. The following claims are intended to cover all such modification and variations.

Some or all of the aspects described herein may generally comprise technologies for surgical instruments with separable motors and motor control circuits, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various aspects of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one aspect, several portions of the subject matter described herein may be implemented via Application Specific Integrated Circuits (ASICs), Field Programmable Gate Arrays (FPGAs), digital signal processors (DSPs), or other integrated formats. Those skilled in the art will recognize, however, that some aspects of the aspects disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative aspect of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Although various aspects have been described herein, many modifications, variations, substitutions, changes, and equivalents to those aspects may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed aspects. The following claims are intended to cover all such modification and variations.

In summary, numerous benefits have been described which result from employing the concepts described herein. The foregoing description of the one or more aspects has been presented for purposes of illustration and description. It is not intended to be exhaustive or limiting to the precise form disclosed. Modifications or variations are possible in light of the above teachings. The one or more aspects were chosen and described in order to illustrate principles and practical application to thereby enable one of ordinary skill in the art to utilize the various aspects and with various modifications as are suited to the particular use contemplated. It is intended that the claims submitted herewith define the overall scope.

Various aspects of the subject matter described herein are set out in the following numbered clauses:

1. A surgical instrument, comprising: a jaw assembly, comprising: a staple cartridge including a plurality of staples; and an anvil, wherein at least one of the staple cartridge and the anvil is movable relative to the other one of the staple cartridge and the anvil to capture tissue therebetween; a firing assembly configured to deploy the plurality of staples into the captured tissue during a firing sequence; and a handle, comprising: an actuator; and an interface; a motor cartridge, wherein the interface is configured to releasably couple the motor cartridge to the handle, wherein the motor cartridge comprises: an electric motor operably coupled to the firing assembly when the motor cartridge is coupled to the handle; and a motor control circuit, wherein the motor control circuit is configured to cause the electric motor to generate at least one rotational motion to motivate the firing assembly to deploy the plurality of staples into the captured tissue in response to actuation of the actuator; and a controller, comprising: a processor; and a computer-readable storage device storing program instructions, which when executed by the processor, cause the processor to detect a malfunction of the motor cartridge.

2. The surgical instrument of Clause 1, wherein the computer-readable storage device is a memory.

3. The surgical instrument of any one of Clauses 1-2, wherein the program instructions when executed further cause the processor to store a damaged status of the motor cartridge in the memory after detecting the malfunction of the motor cartridge.

4. The surgical instrument of any one of Clauses 1-3, further comprising at least one user feedback element, wherein the program instructions when executed further cause the processor to employ the at least one user feedback element to alert a user of the malfunction.

5. The surgical instrument of Clause 4, wherein the program instructions when executed further cause the processor to employ the at least one user feedback element to provide instructions to the user for replacing the motor cartridge.

6. The surgical instrument of any one of Clauses 1-5, further comprising a power source, wherein the program instructions when executed further cause the processor to stop power transmission from the power source to the motor cartridge after detecting the malfunction of the motor cartridge.

7. The surgical instrument of any one of Clauses 1-6, further comprising a current sensor, wherein the program instructions when executed cause the processor to employ the current sensor in the detection the malfunction of the motor cartridge.

8. The surgical instrument of any one of Clauses 1-7, further comprising a motor cartridge replacement feedback element, wherein the program instructions when executed cause the processor to employ the motor cartridge replacement feedback element to detect replacement of the motor cartridge.

9. The surgical instrument of Clause 8, wherein the motor cartridge replacement feedback element is a pressure sensor.

10. A surgical instrument, comprising: an end effector; a drive assembly operably coupled to the end effector; a replaceable motor cartridge, comprising: a motor control circuit board; and a motor; a main control circuit board, comprising; a processor; and a computer-readable storage device storing program instructions, which when executed by the processor, cause the processor to detect a malfunction of the motor cartridge; and an interface, comprising: a mechanical interface portion configured to releasably couple the motor to the drive assembly; and an electrical interface portion configured to releasably couple the motor control circuit board to the main control circuit board.

11. The surgical instrument of Clause 10, wherein the replaceable motor cartridge further comprises another motor.

12. The surgical instrument of any one of Clauses 10-11, wherein the computer-readable storage device is a memory.

13. The surgical instrument of Clause 12, wherein the program instructions when executed further cause the processor to store a damaged status of the motor cartridge in the memory after detecting the malfunction of the motor cartridge.

14. The surgical instrument of any one of Clauses 10-13, further comprising at least one user feedback element, wherein the program instructions when executed further cause the processor to employ the at least one user feedback element to alert a user of the malfunction.

15. The surgical instrument of Clause, wherein the program instructions when executed further cause the processor to employ the at least one user feedback element to provide instructions to the user for replacing the motor cartridge.

16. The surgical instrument of any one of Clauses 10-15, further comprising a power source, wherein the program instructions when executed further cause the processor to stop power transmission from the power source to the motor cartridge after detecting the malfunction of the motor cartridge.

17. The surgical instrument of any one of Clauses 10-16, further comprising a current sensor, wherein the program instructions when executed cause the processor to employ the current sensor in the detection the malfunction of the motor cartridge.

18. The surgical instrument of any one of Clauses 10-17, further comprising a motor cartridge replacement feedback element, wherein the program instructions when executed cause the processor to employ the motor cartridge replacement feedback element to detect replacement of the motor cartridge.

19. The surgical instrument of Clause 18, wherein the motor cartridge replacement feedback element is a pressure sensor.

20 A surgical instrument, comprising: an end effector; a drive assembly operably coupled to the end effector; replaceable high current elements, comprising: a motor control circuit; and a motor; low current elements, comprising; at least one feedback element; a controller, comprising: a processor; and a computer-readable storage device storing program instructions, which when executed by the processor, cause the processor to detect a malfunction of the high current elements; and an interface, comprising: a mechanical interface portion configured to releasably couple the motor to the drive assembly; and an electrical interface portion configured to releasably couple the motor control circuit to the controller.

What is claimed is:

1. A surgical instrument, comprising:
   a motor configured to drive an actuation of an end effector;
   a user interface; and
   a control circuit configured to:
      prevent an activation of the motor;
      display instructions for replacing the motor via the user interface;
      detect installation of a replacement motor; and
      allow an activation of the replacement motor.

2. The surgical instrument of claim 1, wherein the control circuit is configured to prevent the activation of the motor based on a health status of the motor.

3. The surgical instrument of claim 1, wherein the control circuit is configured to prevent the activation of the motor based on a current draw of the motor satisfying a predetermined threshold.

4. The surgical instrument of claim 1, further comprising a housing comprising a motor access door, wherein the control circuit is configured to detect a removal of the motor access door.

5. The surgical instrument of claim 4, wherein the control circuit is configured to prevent the activation of the motor based on detecting the removal of the motor access door.

6. The surgical instrument of claim 4, wherein the control circuit is configured to display instructions for installing the motor access door.

7. The surgical instrument of claim 1, further comprising a motor cartridge interface configured to receive a motor cartridge comprising the motor.

8. The surgical instrument of claim 7, wherein the motor cartridge interface comprises a first rotatable drive connector configured to operably couple with a second rotatable drive connector of the motor cartridge.

9. The surgical instrument of claim 7, wherein the motor cartridge interface comprises a first electrical connector configured to operably couple with a second electrical connector of the motor cartridge for communication between the control circuit and the motor.

10. The surgical instrument of claim 7, wherein the motor cartridge interface comprises a sensor configured to detect the motor cartridge.

11. The surgical instrument of claim 10, wherein the sensor is configured to generate a signal indicative of a pressure between the motor cartridge interface and the motor cartridge, and wherein the control circuit is configured to determine whether the motor cartridge is properly received by the motor cartridge interface based on the signal.

12. The surgical instrument of claim 1, wherein the control circuit is configured to display an alert associated with preventing the activation of the motor via the user interface.

13. A surgical instrument, comprising:
   a motor cartridge interface configured to receive interchangeable motor cartridges capable of driving an activation of an end effector;
   an electronic display; and
   a control circuit configured to:
      detect an installation of a first interchangeable motor cartridge comprising a first motor;
      prevent an activation of the first motor;
      display instructions for replacing the first interchangeable motor cartridge;
      detect an installation of a second interchangeable motor cartridge comprising a second motor; and
      allow an activation of the second motor.

14. The surgical instrument of claim 13, wherein the control circuit is configured to prevent the activation of the first motor based on a health status of the first motor.

15. The surgical instrument of claim 13, wherein the control circuit is configured to prevent activation of the first motor based on a current draw of the first motor satisfying a predetermined threshold.

16. The surgical instrument of claim 13, further comprising a housing comprising a motor access door, wherein the control circuit is configured to detect a removal of the motor access door.

17. The surgical instrument of claim 16, wherein the control circuit is configured to prevent the activation of the first motor based on detecting the removal of the motor access door.

18. The surgical instrument of claim 16, wherein the control circuit is configured to display instructions for installing the motor access door.

19. The surgical instrument of claim 13, wherein the motor cartridge interface comprises a first rotatable drive connector configured to operably couple with a second rotatable drive connector of the first interchangeable motor cartridge.

20. The surgical instrument of claim 13, wherein the motor cartridge interface comprises a sensor configured to detect the installation of the first interchangeable motor cartridge.

* * * * *